(12) United States Patent
Sun et al.

(10) Patent No.: US 12,470,363 B2
(45) Date of Patent: Nov. 11, 2025

(54) DATA TRANSMISSION METHOD, COMMUNICATION APPARATUS, AND COMMUNICATION SYSTEM

(71) Applicant: HUAWEI TECHNOLOGIES CO., LTD., Guangdong (CN)

(72) Inventors: Desheng Sun, Shenzhen (CN); Li Ding, Shenzhen (CN); Hongjun Bi, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 195 days.

(21) Appl. No.: 18/326,283

(22) Filed: May 31, 2023

(65) Prior Publication Data

US 2023/0308259 A1 Sep. 28, 2023

Related U.S. Application Data

(63) Continuation of application No. PCT/CN2021/118784, filed on Sep. 16, 2021.

(30) Foreign Application Priority Data

Dec. 2, 2020 (CN) .......................... 202011410721.1

(51) Int. Cl.
*H04L 9/06* (2006.01)
*H04L 9/40* (2022.01)

(52) U.S. Cl.
CPC ........ *H04L 9/0618* (2013.01); *H04L 63/0428* (2013.01)

(58) Field of Classification Search
CPC ..... H04L 9/12; H04L 9/40; H04L 9/16; H04L 9/0618; H04L 9/3242; H04L 9/0428; H04L 9/162; H04L 63/0435; H04L 63/12
(Continued)

(56) References Cited

U.S. PATENT DOCUMENTS 9,083,516 B2 *   7/2015   Chiesa ...................... H04L 9/12
9,319,878 B2 *   4/2016   Wei ........................ H04W 12/04
(Continued)

OTHER PUBLICATIONS

IEEE Standard for Ethernet, Amendment 10: Media Access Control Parameters, Physical Layers, and Management Parameters for 200 Gb/s and 400 Gb/s Operation, IEEE Computer Society, IEEE Std 802.3bs-2017, Dec. 12, 2017, total 372 pages.
(Continued)

*Primary Examiner* — Amare F Tabor
(74) *Attorney, Agent, or Firm* — Rimon PC

(57) ABSTRACT

This application provides a data transmission method, a communication apparatus, and a communication system. The method includes: generating N ciphertext data flows, where a first ciphertext data flow is any one of the N ciphertext data flows. The first ciphertext data flow includes at least two first alignment markers AMs, at least two encryption parameter sets, and at least two ciphertext data segments. One ciphertext data segment and one encryption parameter set are included between every two first AMs. The at least two first AMs are used for data alignment of the N ciphertext data flows. The method further includes sending the N ciphertext data flows. The data transmission method may be applied to a physical layer of an optical module or a network device.

20 Claims, 17 Drawing Sheets

(58) Field of Classification Search
USPC .......................................................... 713/150
See application file for complete search history.

(56) References Cited

U.S. PATENT DOCUMENTS

| | | | |
|---|---|---|---|
| 10,193,688 B2* | 1/2019 | Gareau | .................. H04L 63/08 |
| 10,404,402 B2* | 9/2019 | Loprieno | .............. H04L 1/0041 |
| 2017/0171163 A1 | 6/2017 | Gareau et al. | |
| 2017/0230338 A1* | 8/2017 | Loprieno | ................ H04L 9/065 |
| 2019/0097748 A1* | 3/2019 | Loprieno | .............. H04L 1/0057 |

OTHER PUBLICATIONS

Build the ultimate performance of intelligent ultra, high speed optical network Huawei's new generation of high-speed coherent transmission system, ultra-high-speed-white-paper-cn, (May 25, 2018), total 31 pages (English translation included).

* cited by examiner

| Bit 0 | 23 24 | 31 32 | 55 56 | 63 64 | 87 88 | 95 96 | 119 |
|---|---|---|---|---|---|---|---|
| {CM$_0$, CM$_1$, CM$_2$} | {UP$_0$} | {CM$_3$, CM$_4$, CM$_5$} | {UP$_1$} | {UM$_0$, UM$_1$, UM$_2$} | {UP$_2$} | {UM$_3$, UM$_4$, UM$_5$} | |

FIG. 4

| PCS lane number | Encoding $\{CM_0,CM_1,CM_2,UP_0,CM_3,CM_4,CM_5,UP_1,UM_0,UM_1,UM_2,UP_2,UM_3,UM_4,UM_5\}$ |
|---|---|
| 0 | 0x9A,0x4A,0x26,0xB6,0x65,0xB5,0xD9,0xD9,0x01,0x71,0xF3,0x26,0xFE,0x8E,0x0C |
| 1 | 0x9A,0x4A,0x26,0x04,0x65,0xB5,0xD9,0x67,0x5A,0xDE,0x7E,0x98,0xA5,0x21,0x81 |
| 2 | 0x9A,0x4A,0x26,0x46,0x65,0xB5,0xD9,0xFE,0x3E,0xF3,0x56,0x01,0xC1,0x0C,0xA9 |
| 3 | 0x9A,0x4A,0x26,0x5A,0x65,0xB5,0xD9,0x84,0x86,0x80,0xD0,0x7B,0x79,0x7F,0x2F |
| 4 | 0x9A,0x4A,0x26,0xE1,0x65,0xB5,0xD9,0x19,0x2A,0x51,0xF2,0xE6,0xD5,0xAE,0x0D |
| 5 | 0x9A,0x4A,0x26,0xF2,0x65,0xB5,0xD9,0x4E,0x12,0x4F,0xD1,0xB1,0xED,0xB0,0x2E |
| 6 | 0x9A,0x4A,0x26,0x3D,0x65,0xB5,0xD9,0xEE,0x42,0x9C,0xA1,0x11,0xBD,0x63,0x5E |
| 7 | 0x9A,0x4A,0x26,0x22,0x65,0xB5,0xD9,0x32,0xD6,0x76,0x5B,0xCD,0x29,0x89,0xA4 |
| 8 | 0x9A,0x4A,0x26,0x60,0x65,0xB5,0xD9,0x9F,0xE1,0x73,0x75,0x60,0x1E,0x8C,0x8A |
| 9 | 0x9A,0x4A,0x26,0x6B,0x65,0xB5,0xD9,0xA2,0x71,0xC4,0x3C,0x5D,0x8E,0x3B,0xC3 |
| 10 | 0x9A,0x4A,0x26,0xFA,0x65,0xB5,0xD9,0x04,0x95,0xEB,0xD8,0xFB,0x6A,0x14,0x27 |
| 11 | 0x9A,0x4A,0x26,0x6C,0x65,0xB5,0xD9,0x71,0x22,0x66,0x38,0x8E,0xDD,0x99,0xC7 |
| 12 | 0x9A,0x4A,0x26,0x18,0x65,0xB5,0xD9,0x5B,0xA2,0xF6,0x95,0xA4,0x5D,0x09,0x6A |
| 13 | 0x9A,0x4A,0x26,0x14,0x65,0xB5,0xD9,0xCC,0x31,0x97,0xC3,0x33,0xCE,0x68,0x3C |
| 14 | 0x9A,0x4A,0x26,0xD0,0x65,0xB5,0xD9,0xB1,0xCA,0xFB,0xA6,0x4E,0x35,0x04,0x59 |
| 15 | 0x9A,0x4A,0x26,0xB4,0x65,0xB5,0xD9,0x56,0xA6,0xBA,0x79,0xA9,0x59,0x45,0x86 |

FIG. 5

DATA TRANSMISSION METHOD, COMMUNICATION APPARATUS, AND COMMUNICATION SYSTEM

CROSS-REFERENCE TO RELATED APPLICATIONS

This application is a continuation of International Application No. PCT/CN2021/118784, filed on Sep. 16, 2021, which claims priority to Chinese Patent Application No. 202011410721.1, filed on Dec. 2, 2020. The disclosures of the aforementioned applications are hereby incorporated by reference in their entireties.

TECHNICAL FIELD

This application relates to the field of communication technologies, and in particular, to a data transmission method, a communication apparatus, and a communication system.

BACKGROUND

Currently, with the popularization of mobile smart terminals and personal computers, the internet has become a part of people's work and life. Generally, most data is transmitted in plaintext on a local area network. In this way, there are many security risks. For example, bank account information gets stolen, tampered with, and may be subject to a malicious network attack. Therefore, ensuring security of network data transmission has become a basic requirement of enterprises and individual customers. In addition, in a currently widely used network security technology, data encryption technology is an important means to ensure network security.

An encryption technology based on a medium access control security (MACSEC) protocol is a security encryption technology commonly used in a data network currently. The encryption technology is based on a data link layer of an open system interconnection reference model (OSI), and is a standardized layer 2 encryption technology. Currently, the encryption technology is widely used on network devices that have a high requirement on data confidentiality for government, military, finance, and the like. For example, between two routers that transmit data through an optical transmission device, the security of data in an intermediate transmission device may be ensured through the encryption technology based on the MACSEC protocol.

An implementation layer of the encryption technology based on the MACSEC protocol is above a MAC layer. An object of encryption and decryption is each user frame.

In a method of encrypting each user frame by using the encryption technology based on the MACSEC protocol at the MAC layer, an encryption parameter needs to be carried in each user frame. As a result, the amount of user data that can be sent in each user frame is reduced, more user service bandwidth is occupied, and the cost becomes high. In addition, the encryption technology based on the MACSEC protocol does not encrypt a source MAC address and a destination MAC address, leading to security risks.

SUMMARY

This application provides a data transmission method, a communication apparatus, and a communication system, to improve a user data sending rate and improve security.

According to a first aspect, an embodiment of this application provides a data transmission method, including: generating N ciphertext data flows, where a first ciphertext data flow is any one of the N ciphertext data flows, the first ciphertext data flow includes at least two first alignment markers (AMs), at least two encryption parameter sets, and at least two ciphertext data segments, one ciphertext data segment and one encryption parameter set are included between every two first AMs, the at least two first AMs are used for data alignment of the N ciphertext data flows, and N is a positive integer; and sending the N ciphertext data flows.

Based on the solution, an encryption parameter and ciphertext data are sent through N data flows. The method may be applied to a physical layer of an optical module or a network device. Therefore, an encryption parameter that is sent does not occupy a user service bandwidth, a data transmission volume is increased, and a data transmission rate is further increased. In addition, in solutions disclosed herein, the bit stream at the physical layer is encrypted, and all bits (including a source MAC address and a destination MAC address) in a user frame are encrypted. Therefore, address information is not exposed, and security is improved.

In a possible implementation method, the encryption parameter set includes one or more of the following:
an encryption type, where the encryption type identifies whether encryption is performed;
a key identification, where the key identification indicates an encryption key used by a first ciphertext data segment; and
an initialization vector identification, where the initialization vector identification indicates an initialization vector used by a second ciphertext data segment.

In a possible implementation method, two first AMs adjacent to the second ciphertext data segment and two first AMs adjacent to the initialization vector identification are respectively the same.

In a possible implementation method, the encryption parameter set further includes an integrity check value, and the integrity check value is used to perform integrity check on a ciphertext data segment between the two first AMs before the integrity check value.

In a possible implementation method, the generating of N ciphertext data flows includes: obtaining N plaintext data flows, where a first plaintext data flow is any one of the N plaintext data flows, the first plaintext data flow includes at least two second AMs and at least two plaintext data segments, and the at least two second AMs are used for data alignment of the N plaintext data flows; and where one plaintext data segment is included between every two second AMs, and one second AM is included between every two plaintext data segments; and generating the first ciphertext data flow based on the first plaintext data flow and the at least two encryption parameter sets.

In a possible implementation method, a first plaintext data segment is any one of the at least two plaintext data segments, and a third ciphertext data segment is a ciphertext data segment obtained by encrypting the first plaintext data segment by using a first encryption parameter set in the at least two encryption parameter sets. The generating of the first ciphertext data flow based on the first plaintext data flow and the at least two encryption parameter sets includes: encrypting the first plaintext data segment based on the first encryption parameter set, to obtain the third ciphertext data segment; and inserting the first encryption parameter set into the first plaintext data flow, to obtain the first ciphertext data flow.

In a possible implementation method, the inserting of the first encryption parameter set into the first plaintext data flow to obtain the first ciphertext data flow includes: inserting the first encryption parameter set into the first plaintext data flow, to obtain a second ciphertext data flow; and performing forward error correction encoding or performing scrambling and forward error correction encoding on the second ciphertext data flow, to obtain the first ciphertext data flow.

In a possible implementation method, the inserting of the first encryption parameter set into the first plaintext data flow to obtain the first ciphertext data flow includes: separately inserting the first encryption parameter set into N first plaintext data flows, to obtain N third ciphertext data flows; converting the N third ciphertext data flows into at least one serial ciphertext data flow based on a specified proportion; performing forward error correction encoding or performing scrambling and forward error correction encoding on the at least one serial ciphertext data flow, to obtain at least one encoded serial ciphertext data flow; and converting the at least one encoded serial ciphertext data flow into N first ciphertext data flows.

In a possible implementation method, the obtaining of N plaintext data flows includes: receiving M physical lane signals, where M is a positive integer; and converting the M physical lane signals into the N plaintext data flows based on the specified proportion.

In a possible implementation method, the inserting of the first encryption parameter set into the first plaintext data flow to obtain the first ciphertext data flow includes: inserting the first encryption parameter set and padding information into the first plaintext data flow, to obtain the first ciphertext data flow.

In a possible implementation method, the padding information is padding information encrypted using the first encryption parameter set.

According to a second aspect, an embodiment of this application provides a data transmission method, including: obtaining N ciphertext data flows, where a first ciphertext data flow is any one of the N ciphertext data flows, the first ciphertext data flow includes at least two first alignment markers AMs, at least two encryption parameter sets, and at least two ciphertext data segments, one ciphertext data segment and one encryption parameter set are comprised between every two first AMs, the at least two first AMs are used for data alignment of the N ciphertext data flows, and N is a positive integer; and decrypting the first ciphertext data flow based on the at least two encryption parameter sets, to obtain a first plaintext data flow, where the first plaintext data flow is any one of N plaintext data flows. In addition, a bit stream at the physical layer is encrypted, and all bits (including a source MAC address and a destination MAC address) in a user frame are encrypted. Therefore, address information is not exposed, and security is improved.

Based on the solution, an encryption parameter and ciphertext data are sent through N data flows. The method may be applied to a physical layer of an optical module or a network device. Therefore, an encryption parameter that is sent in the N data flows does not occupy a user service bandwidth, a data transmission volume is increased, and a data transmission rate is further increased.

In a possible implementation method, the encryption parameter set includes one or more of the following:

an encryption type, where the encryption type identifies whether encryption is performed;

a key identification, where the key identification indicates an encryption key used by a first ciphertext data segment; and an initialization vector identification, where the initialization vector identification indicates an initialization vector used by a second ciphertext data segment.

In a possible implementation method, two first AMs adjacent to the second ciphertext data segment and two first AMs adjacent to the initialization vector identification are respectively the same.

In a possible implementation method, the encryption parameter set further includes an integrity check value, and the integrity check value is used to perform integrity check on a ciphertext data segment between the two first AMs before the integrity check value.

In a possible implementation method, the first plaintext data flow includes at least two second AMs and at least two plaintext data segments, one plaintext data segment is included between every two second AMs, one second AM is included between every two plaintext data segments, and the at least two second AMs are used for data alignment of the N plaintext data flows.

In a possible implementation method, a first plaintext data segment is any one of the at least two plaintext data segments, and a third ciphertext data segment is a ciphertext data segment obtained by encrypting the first plaintext data segment using a first encryption parameter set in the at least two encryption parameter sets; and the decrypting of the first ciphertext data flow based on the at least two encryption parameter sets to obtain a first plaintext data flow includes: decrypting the third ciphertext data segment based on the first encryption parameter set, to obtain the first plaintext data segment; and removing the first encryption parameter set from the first plaintext data flow, to obtain the first plaintext data flow.

In a possible implementation method, the decrypting of the third ciphertext data segment based on the first encryption parameter set to obtain the first plaintext data segment includes: performing forward error correction decoding or performing descrambling and forward error correction decoding on the first ciphertext data flow, to obtain a second ciphertext data flow; and decrypting the third ciphertext data segment of the second ciphertext data flow based on the first encryption parameter set, to obtain the first plaintext data segment.

In a possible implementation method, the decrypting of the third ciphertext data segment based on the first encryption parameter set to obtain the first plaintext data segment includes: converting N first ciphertext data flows into at least one serial ciphertext data flow based on a specified proportion; performing forward error correction decoding or performing descrambling and forward error correction decoding on the at least one serial ciphertext data flow, to obtain at least one decoded serial ciphertext data flow; converting the at least one decoded serial ciphertext data flow into N third ciphertext data flows; and separately decrypting the third ciphertext data segment of the N third ciphertext data flows based on the first encryption parameter set, to obtain N first plaintext data segments.

In a possible implementation method, the removing of the first encryption parameter set from the first plaintext data flow to obtain the first plaintext data flow includes: removing the first encryption parameter set and padding information from the first plaintext data flow to obtain the first plaintext data flow.

In a possible implementation method, the padding information is padding information encrypted by using the first encryption parameter set.

Based on any implementation method of the first aspect or the second aspect, in a possible implementation method, a quantity of bits of padding information between two adjacent first AMs is determined based on a quantity of bits spaced between the two adjacent first AMs and a quantity of bits in the encryption parameter set between the two adjacent first AMs.

Based on the solution, it may be ensured that an AM is always located at a beginning of a forward error correction codeword during forward error correction encoding, so that the decryption side can perform forward error correction decoding after identifying the AM.

In a possible implementation method, (Y+a+P) mod Q=0, where Y is the quantity of bits spaced between the two adjacent first AMs, a is the quantity of bits in the encryption parameter set between the two adjacent first AMs, P is the quantity of bits of the padding information between the two adjacent first AMs, Q is a quantity of bits included in one forward error correction codeword, and mod is a modulo operation.

In a possible implementation method, P is a minimum value that meets the formula.

In a possible implementation method, any one of the foregoing methods is applied to an optical module.

According to a third aspect, an embodiment of this application provides a communication apparatus, including a processor and a memory, where the memory is configured to store computer-executable instructions. When the apparatus runs, the processor executes the computer-executable instructions stored in the memory, the apparatus is enabled to perform various implementation methods in the first aspect or the second aspect.

According to a fourth aspect, an embodiment of this application provides a communication apparatus, including units or means (means) configured to perform various steps of the implementation method in the first aspect or the second aspect.

According to a fifth aspect, an embodiment of this application provides a communication apparatus, including a processor and an interface circuit. The processor is configured to communicate with another apparatus through the interface circuit, and perform various implementation methods in the first aspect or the second aspect. The apparatus may include one or more processors.

According to a sixth aspect, an embodiment of this application provides a communication apparatus, including a processor, configured to connect to a memory, and configured to invoke a program stored in the memory, to perform various implementation methods in the first aspect or the second aspect. The memory may be located inside or outside the apparatus. There is one or more processors.

According to a seventh aspect, an embodiment of this application further provides a computer-readable storage medium, where the computer-readable storage medium stores instructions; and when the instructions are run on a computer, various implementation methods in the first aspect or the second aspect are performed.

According to an eighth aspect, an embodiment of this application further provides a computer program product. The computer product includes a computer program. When the computer program runs, various implementation methods in the first aspect or the second aspect are performed.

According to a ninth aspect, an embodiment of this application further provides a chip system, including: a processor, configured to perform various implementation methods in the first aspect or the second aspect.

According to a tenth aspect, an embodiment of this application further provides a communication system, including: a communication apparatus configured to perform various implementation methods in the first aspect, and a communication apparatus configured to perform various implementation methods in the second aspect.

BRIEF DESCRIPTION OF DRAWINGS

FIG. 4 is a schematic diagram of an AM format of 200 G/400 G;

FIG. 5 is a schematic diagram of an AM format of each logic lane of 400 G;

DESCRIPTION OF EMBODIMENTS

Figure 1:
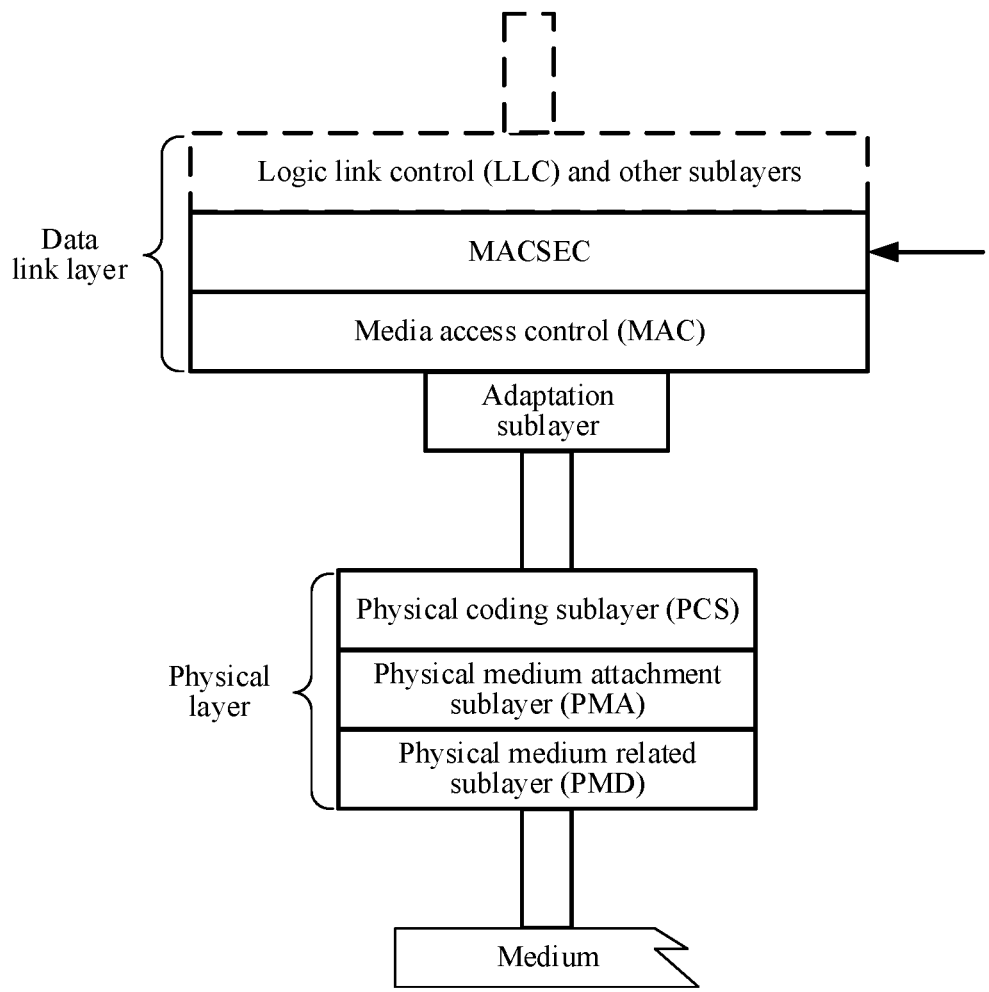
FIG. 1 is a schematic diagram of an architecture of an Ethernet data link layer and a physical layer.

FIG. 1 is a schematic diagram of an architecture of an Ethernet data link layer and a physical layer. The data link layer includes a medium access control (MAC) layer, a MACSEC layer, a logic link control (LLC) layer, and other sublayers. The physical layer includes a physical coding sublayer (PCS), a physical medium attachment (PMA) sublayer, and a physical medium dependent (PMD) sublayer. A medium may be a cable, a pluggable optical module, an optical fiber, or the like.

The data link layer receives a packet from a user side, frames the packet through the MAC layer, encodes a code block in the PCS, distributes the packet to a plurality of logic lanes, performs conversion through a bit multiplexer or demultiplexer (BitMux) at the PMA sublayer, and distributes the packet to a plurality of physical lanes (related to the PMD sublayer).

Figure 2:
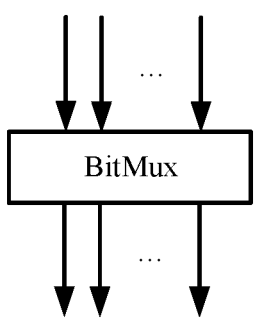
FIG. 2 is a schematic diagram of an operating principle of a BitMux.

FIG. 2 is a schematic diagram of an operating principle of a BitMux. The BitMux converts a signal flow of an input lane into an output lane in a bit interleaving manner. When the BitMux is deployed at a physical layer, the BitMux is configured to implement conversion between N logic lanes and M physical lanes. For example, signal flows of sixteen logic lanes are converted into eight physical lanes. When the BitMux is deployed in an optical module, the BitMux is configured to implement conversion between signals of M physical lanes and K digital signals, for example, convert signal flows of eight physical lanes into two digital signals.

In some embodiments of this application, the logic lane, also referred to as a virtual lane, refers to a PCS lane or a forward error correction (FEC) code lane (the FEC lane in a standard of 100 G, and the PCS lane in a standard of 200 G/400 G). The PCS distributes serial flows to a plurality of lanes. These lanes are generally distributed inside an implementation unit, and are generally referred to as the logic lanes or the virtual lanes to distinguish these lanes from PAM lanes. For example, in an Ethernet specification, a quantity of PCS lanes corresponding to 200 G is 8, a quantity of PCS lanes corresponding to 400 G is 16, and a quantity of FEC lanes corresponding to 100 G is 4.

In some embodiments of this application, the physical lane may be the PMA lane. One physical lane may carry data of one or more logic lanes. In a high-speed Ethernet of 100 G/200 G/400 G, a quantity of physical lanes is different depending on different implementation.

Figure 3:
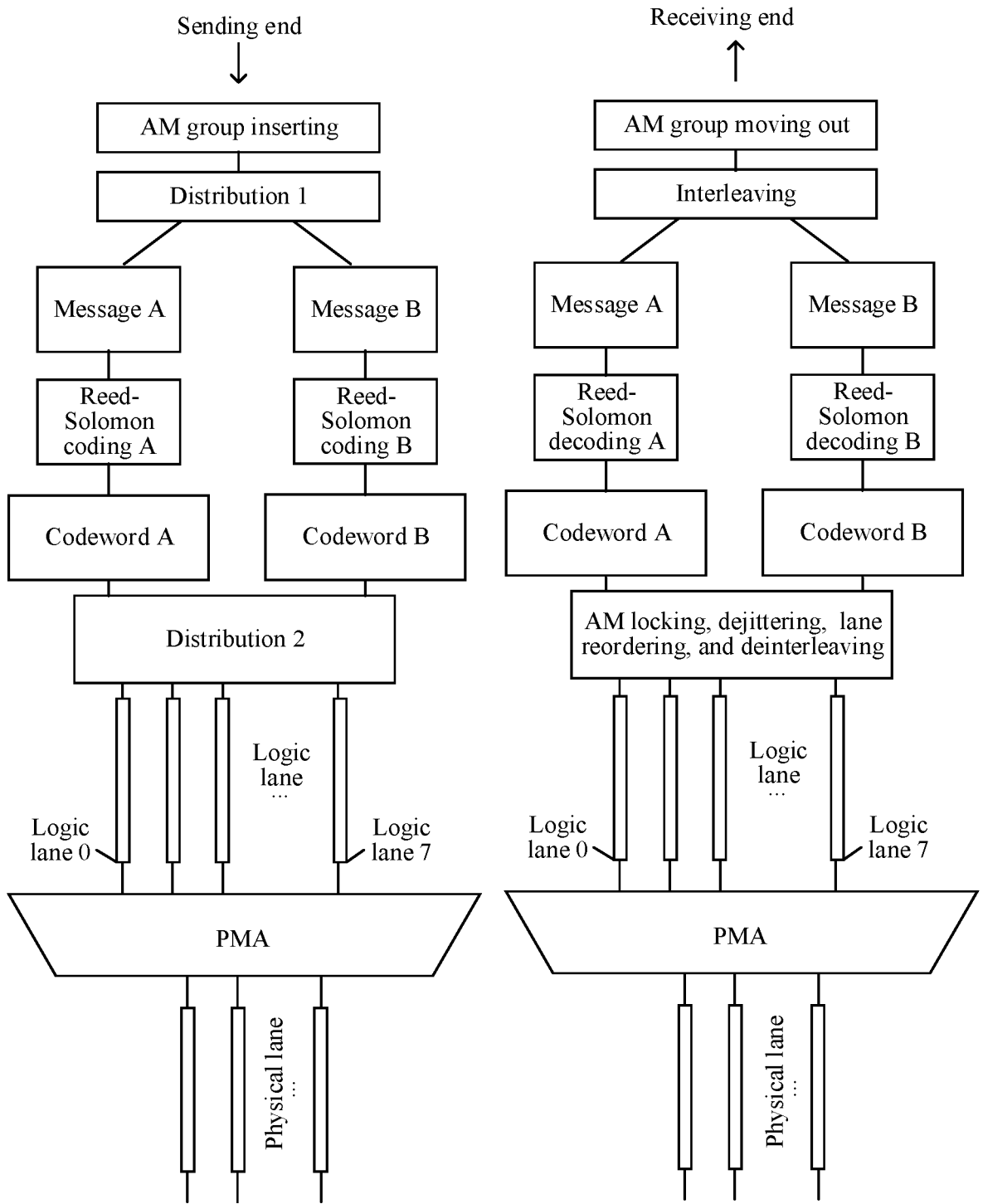
FIG. 3 is a schematic diagram of a relationship among a logic lane, a physical lane, distribution of an AM, and a BitMux.

FIG. 3 is a schematic diagram of a relationship between distribution of a logic lane, a physical lane, an alignment marker (AM), and a BitMux (built in PMA).

The alignment identifier (AM) is also referred to as an alignment code block or an alignment unit, for example, a length is 120 bits. When sending one serial signal to a plurality of lanes, a sending end may periodically insert the AM into each lane, and a receiving end performs locking based on the AM in each lane, to implement data alignment of the plurality of lanes. This combines the data of the plurality of lanes into one lane of serial data.

In a multi-lane (PCS, FEC, or PMA) architecture of 40 G/50 G/100 G/200 G/400 G in an IEEE 802.3 specification, when data is transmitted on different logic lanes and physical lanes, to ensure that the receiving end may perform data alignment on a plurality of logic lanes, an alignment code block is designed in the IEEE 802.3 specification. FIG. 4 is a schematic diagram of an AM format of 200 G/400 G. CM0, CM1, CM2, CM3, CM4, and CM5 are common identifiers of all logic lanes, and UM0, UM1, UM2, UM3, UM4, and UM5 uniquely identify one logic lane. FIG. 5 is a schematic diagram of an AM format of each logic lane of 400 G. A receiving end may lock one logic lane and correctly identify a number of the logic lane only when receiving an AM whose fields except UP0 to UP2 fields (which may be edited by a user) match those in FIG. 5.

Currently, with the popularization of mobile smart terminals and personal computers, the internet has become a part of people's work and life. Generally, most data is transmitted in plaintext on a local area network. There are many security risks associated with transmitting plaintext. For example, bank account information gets stolen, tampered with, and may be subject to a malicious network attack. Therefore, ensuring the security of network data transmission has become a basic requirement of enterprises and individual customers. In addition, in a currently widely used network security technology, data encryption technology is an important means to ensure network security.

An encryption technology based on a MACSEC protocol is a security encryption technology commonly used in a data network currently. With reference to FIG. 1, the encryption technology is based on an OSI data link layer, and is a standardized layer 2 encryption technology. Currently, the encryption technology is widely used on network devices that have a high requirement on data confidentiality for government, military, finance, and the like. For example, when two routers transmit data through an optical transmission device, the security of the data in an intermediate transmission device may be ensured through the encryption technology based on the MACSEC protocol.

An implementation layer of the encryption technology based on the MACSEC protocol is above a MAC layer. An object (e.g., unit) of encryption and decryption is a user frame.

Figure 6:
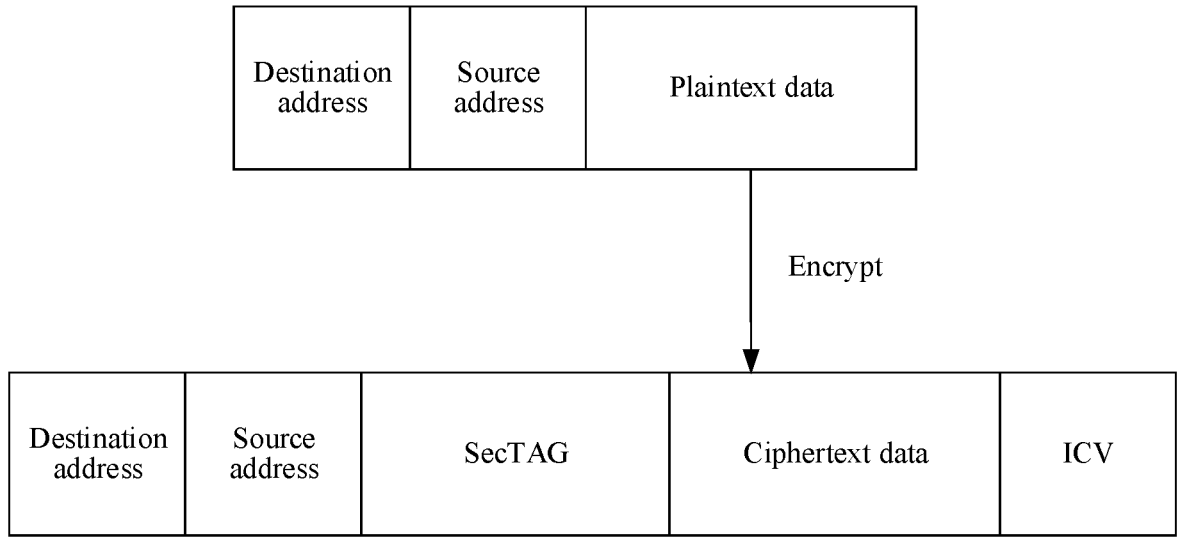
FIG. 6 is a schematic diagram of an encryption process at a sending end.

FIG. 6 is a schematic diagram of an encryption process at a sending end. The sending end encrypts plaintext data (namely, unencrypted data) based on an encryption algorithm, a key, and an initialization vector (IV), to obtain ciphertext data (namely, encrypted data).

When sending a packet, the sending end carries, in the packet, the ciphertext data, a security tag (SecTAG), and an integrity check value (ICV) generated in an encryption process. The SecTAG includes a key identification and an IV identification. The key identification is used as an encryption key corresponding to the ciphertext data, and the IV identification indicates an IV corresponding to the ciphertext data.

After receiving the packet, a receiving end calculates and obtains the plaintext data and the ICV based on the ciphertext data, the key, the IV, and a decryption algorithm. In addition, only when the calculated ICV is the same as the ICV carried in the packet, the calculated ICV is considered to be correct, and otherwise decryption fails.

For the foregoing method for encrypting each user frame by using an encryption technology based on a MACSEC protocol at a MAC layer, there are the following problems.

Problem 1: MACSEC encrypts each user frame or packet, and requires each frame or packet to carry 32 bytes of information related to encryption. When an average frame length is 64 bytes, 32/64=50% of a user bandwidth is occupied by encryption information and the overhead is high.

Problem 2: When a capacity of a network device doubles in recent years, power consumption brings more engineering challenges such as heat dissipation and power supply. A customer has an increasingly strong requirement for power consumption reduction. With accelerated promotion of high-performance calculation and artificial intelligence, network latency has also increasingly become a concern. Although the encryption and decryption technology based on the MACSEC protocol implements data encryption and decryption based on an Ethernet data link layer (layer 2), with an increase of system capacity and port bandwidth, power consumption for implementing a MACSEC function based on a high-speed and large-capacity chip increases as a result. In addition, the impact of latency on a new service is becoming more obvious. From the implementation perspective, in the industry, generally, a physical chip that supports the MACSEC function is disposed outside a board (refer to FIG. 7). In addition, the MACSEC function is also implemented based on chip switching. Both a physical chip-based manner and a chip switching-based manner are closely related to board hardware. Therefore, the requirement that MACSEC encryption and decryption be implemented on a conventional and old board cannot be met. In addition, a requirement for port encryption in a customer field application is often dynamic and unpredictable, such as: when the network device is purchased, only eight fixed ports support the MACSEC function, which basically meets a current requirement. If more MACSEC ports are required in future applications, a hardware solution needs to be updated and investment needs to be increased. If a quantity of MACSEC ports on the purchased network device is far greater than an actual requirement, over-investment may occur. Therefore, the solution cannot meet a customer's requirement of the customer that a conventional hardware system be used or be dynamically changed onsite.

Problem 3: The encryption technology based on the MACSEC protocol does not encrypt a source MAC address and a destination MAC address, and there are security risks.

To resolve the foregoing problems, a lightweight encryption and decryption framework is designed in embodiments of this application, and a universal encryption or decryption algorithm is supported. One implementation method is to move the encryption and decryption function down to a flexible pluggable module, such as an optical module or another type of module. Another implementation method is to move an encryption and decryption function down to a physical layer of the network device, so that when an encryption parameter is sent, the encryption parameter is sent through the physical layer.

Figure 7:
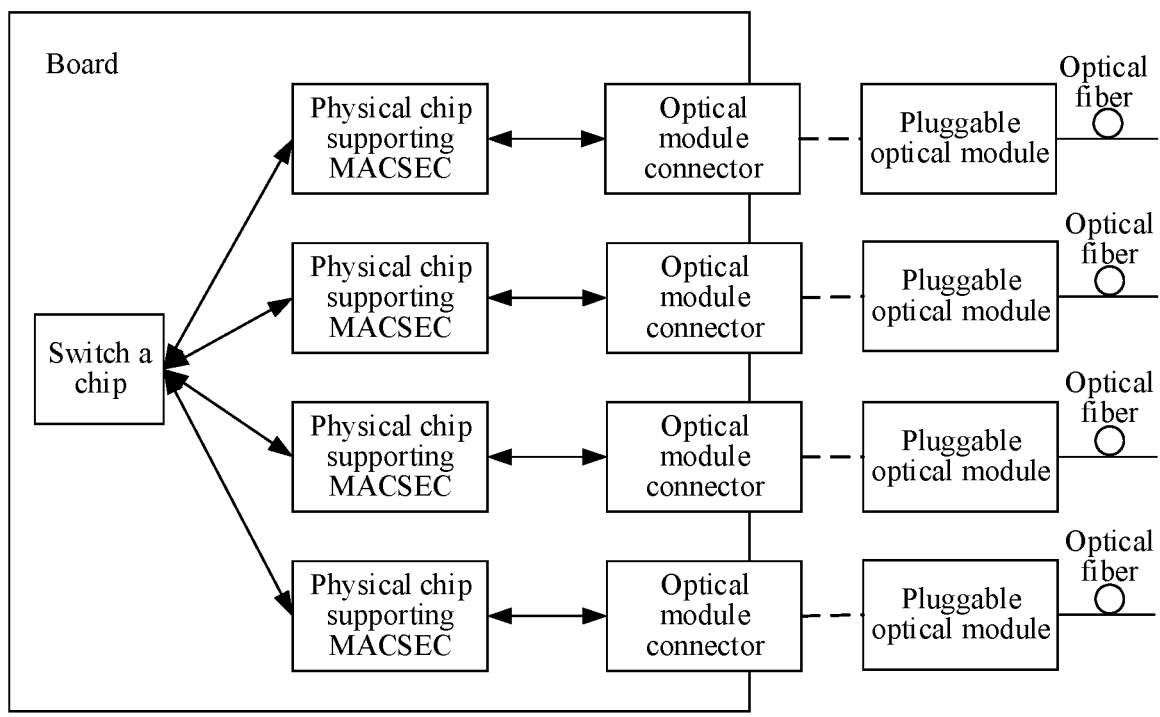
FIG. 7 is a schematic diagram of a physical chip supporting a MACSEC function outside a board.

For example, with reference to FIG. 7, an encryption and decryption function may be removed from a physical chip, and then the encryption and decryption function may be added to a pluggable optical module. Compared with a conventional technology, the solution has the following improvements.

First, the encryption and decryption function are deployed in a module below MAC. An encryption and decryption framework is designed based on a native AM of an Ethernet. The encryption and decryption framework supports integrity protection check without consuming a user service bandwidth.

For the foregoing problem 1, in the conventional technology, MACSEC encrypts each user frame or packet, and requires each frame or packet to carry 32 bytes of encryption information. When an average frame length is 64 bytes, 32/64=50% of a user bandwidth is occupied and the overhead is high. Based on solutions disclosed herein, at a MAC layer, because the encryption and decryption function is removed, each user frame does not need to carry the 32 byte encryption information. Therefore, these bytes may be used to carry data. Therefore, in the solution, a data transmission volume may be increased assuming a same user service bandwidth. In this way, a data transmission rate is improved.

Second, in embodiments of this application, the encryption and decryption function is moved down to the flexible pluggable optical module. Therefore, a requirement on a board capability is avoided, power consumption of a board is reduced, and a quantity of pluggable optical modules may be flexibly selected based on an actual requirement. Therefore, a problem that a quantity of MACSEC ports on a board does not meet an actual requirement is resolved.

Third, because a bit stream at the physical layer is encrypted in embodiments of this application, all bits (including a source MAC address and a destination MAC address) in a user frame are encrypted, and address information is not exposed. Therefore, security is higher.

For another example, with reference to FIG. 7, the encryption and decryption function may be removed from a physical chip and added to the physical layer structure shown in FIG. 3. Compared with a conventional technology, the solution has the following improvements.

First, the encryption and decryption functions are deployed in a module below MAC. The encryption and decryption framework is designed based on a native AM of an Ethernet. The encryption and decryption framework supports integrity protection check without using a user service bandwidth.

For the foregoing problem 1, in the conventional technology, MACSEC encrypts each user frame or packet, and requires each frame or packet to carry 32 bytes of encryption information. When an average frame length is 64 bytes, 32/64=50% of a user bandwidth is occupied by encryption information and an overhead is high. Based on the solution, at a MAC layer, because the encryption and decryption function are removed, each user frame does not need to carry the 32 bytes. Therefore, these bytes may be used to carry user data. Therefore, in the solution, a data sending volume may be increased assuming a same user service bandwidth. In this way, a data sending rate is improved.

Second, because a bit stream at the physical layer is encrypted in embodiments of this application, all bits (including a source MAC address and a destination MAC address) in a user frame are encrypted, and address information is not exposed. Therefore, security is higher.

To resolve the foregoing problems, the following describes the data transmission method provided in embodiments of this application with reference to the accompanying drawings. The data transmission method involves data encryption at the sending end and data decryption at the receiving end.

The following first describes some concepts or relationships between concepts in embodiments of this application.

1. Plaintext Data Flow

In embodiments of this application, N plaintext data flows refer to unencrypted data flows transmitted through N logic lanes. Any one of the N plaintext data flows is referred to as a first plaintext data flow. The first plaintext data flow includes at least two second AMs and at least two plaintext data segments, and the at least two second AMs are used for data alignment of the N plaintext data flows. One plaintext data segment is included between every two second AMs, and one second AM is included between every two plaintext data segments.

Figure 10:
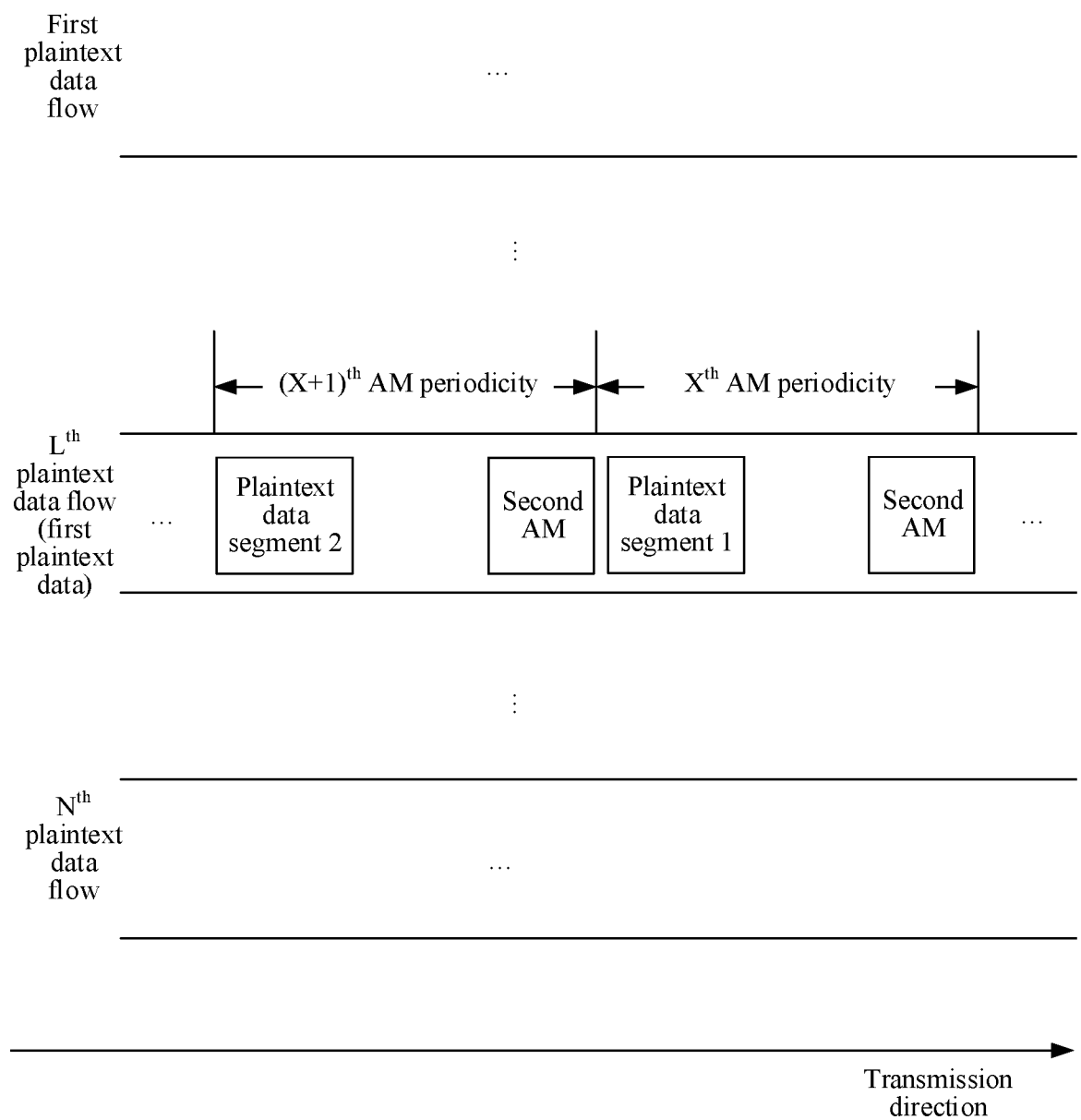
FIG. 10 is a schematic diagram of N plaintext data flows.

In an implementation, the second AMs in one plaintext data flow are periodically inserted, the second AMs in a same plaintext data flow are the same, and the second AMs in different plaintext data flows are different. The second AM and the plaintext data segment in each plaintext data flow appear periodically. FIG. 10 is a schematic diagram of N plaintext data flows. Each AM periodicity includes one second AM and one plaintext data segment.

2. Ciphertext Data Flow

In embodiments of this application, N ciphertext data flows refer to encrypted data flows transmitted through N logic lanes. Any one of the N ciphertext data flows is referred to as a first ciphertext data flow. The first ciphertext data flow includes at least two first AMs, at least two encryption parameter sets, and at least two ciphertext data segments. One ciphertext data segment and one encryption parameter set are included between every two first AMs; and the at least two first AMs are used for data alignment of the N ciphertext data flows, and N is a positive integer.

In an implementation, the first AMs in one ciphertext data flow are periodically inserted, the first AMs in a same ciphertext data flow are the same, and the first AMs in different ciphertext data flows are different.

Figure 9:
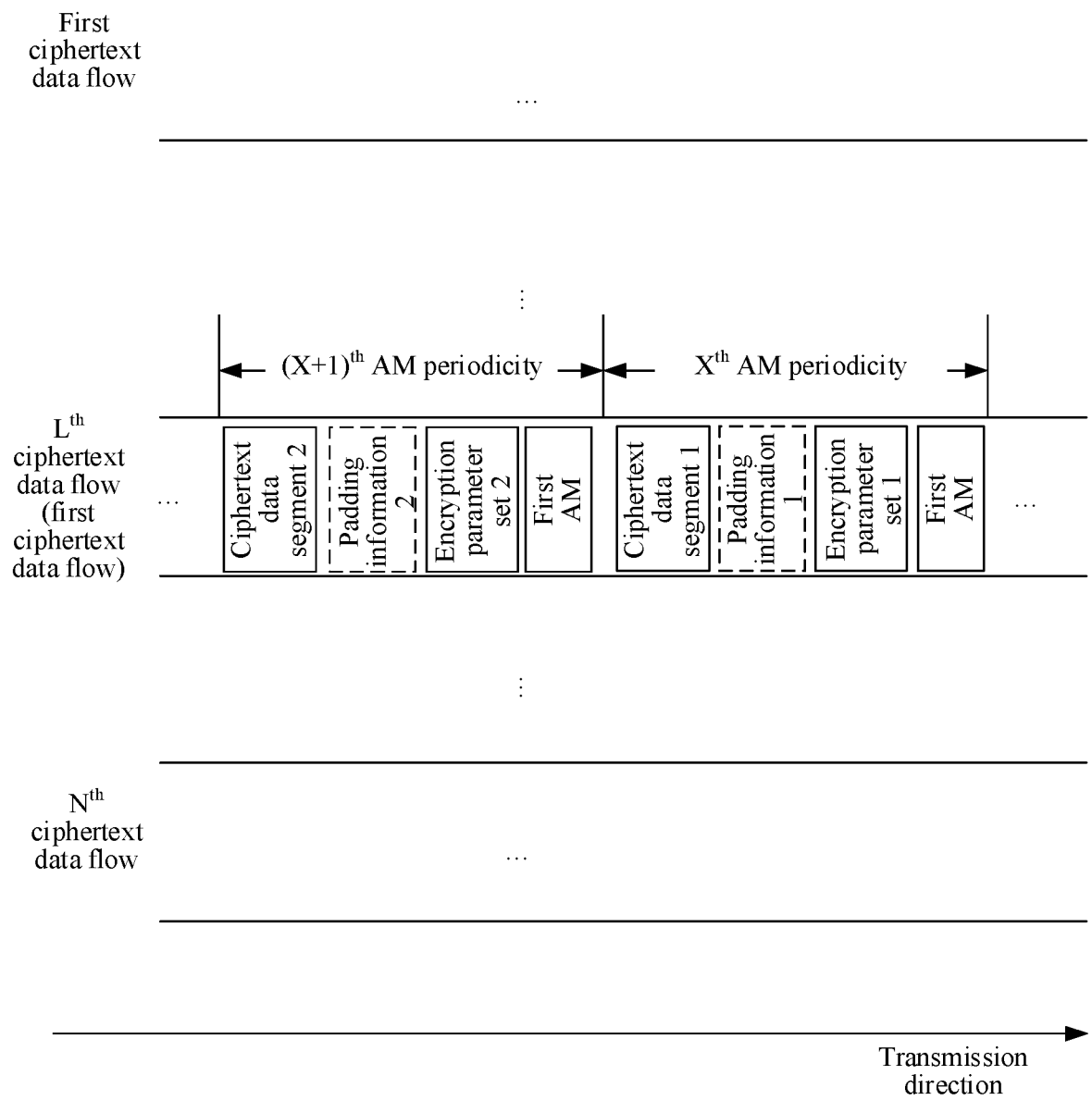
FIG. 9 is a schematic diagram of N ciphertext data flows.

The first AM, the encryption parameter set, and the ciphertext data segment in each ciphertext data flow appear periodically. FIG. 9 is a schematic diagram of N ciphertext data flows. Each AM periodicity includes one first AM, one encryption parameter set, and one ciphertext data segment. Optionally, each AM periodicity further carries one piece of padding information. The padding information may be padding information encrypted by using the encryption parameter set, or may be padding information that is not encrypted.

In an implementation, information carried in different AM periodicities appears in a same order. For example, with reference to FIG. 9, a first AM, an encryption parameter set, padding information (optional), and a ciphertext data segment are sequentially carried in each AM periodicity.

In another implementation, information carried in different AM periodicities may also appear in different orders, but may be cyclically performed based on granularities of a plurality of AM periodicities. For example, a first AM periodicity in two adjacent AM periodicities successively carries the first AM, the encryption parameter set, the padding information (optional), and the ciphertext data segment. A second AM periodicity in two adjacent AM periodicities successively carries the first AM, the encryption parameter set, the ciphertext data segment, and the padding information (optional). Subsequently, two AM periodicities in every two adjacent AM periodicities also carry, in a same manner, information that needs to be sent.

In an implementation, the encryption parameter set in each AM periodicity may be continuous, to be specific, appearing in a form of an encryption parameter segment. For example, with reference to FIG. 9, the encryption parameter set in each AM periodicity is continuous. One first AM and one encryption parameter set are included between every two ciphertext data segments, and one first AM and one ciphertext data segment are included between every two encryption parameter sets.

In another implementation, the encryption parameter set in each AM periodicity may also be discontinuous. For example, the encryption parameter set in each AM periodicity is divided into at least two encryption parameter subsets, and some or all encryption subsets in the at least two encryption parameter subsets are discontinuous. For example, the encryption parameter set in each AM periodicity is divided into two encryption parameter subsets, and the two encryption parameter subsets are respectively located on two sides of a ciphertext data segment in a same AM periodicity.

3. Relationship Between a Plaintext Data Flow and a Ciphertext Data Flow

In embodiments of this application, N plaintext data flows are encrypted, to obtain N ciphertext data flows. For example, the N ciphertext data flows shown in FIG. 9 may be generated based on the N plaintext data flows shown in FIG. 10.

In an implementation, the second AM in the N plaintext data flows is correspondingly the same as the first AM in the N ciphertext data flows. For example, second AMs in a same plaintext data flow are the same, and second AMs in different plaintext data flows are different. First AMs in a same ciphertext data flow are the same, and first AMs in different ciphertext data flows are different. In addition, the second AM in the $L^{th}$ plaintext data flow is the same as the first AM in the $L^{th}$ ciphertext data flow. For example, with reference to FIG. 9 and FIG. 10, both an AM in the first plaintext data flow and an AM in the first ciphertext data flow are AM1, both an AM in the second plaintext data flow and an AM in the second ciphertext data flow are AM2, and the rest can be deduced by analogy.

4. Plaintext Data Segment and Ciphertext Data Segment

The plaintext data segment (for example, the first plaintext data segment) in embodiments of this application includes unencrypted data (also referred to as unencrypted data), and the ciphertext data segment (such as a first ciphertext data segment, a second ciphertext data segment, and a third ciphertext data segment) refers to a data segment obtained by encrypting the plaintext data segment.

5. Encryption Parameter Set

In embodiments of this application, the encryption parameter set refers to a set including one or more encryption parameters. The encryption parameter set is a logic concept. One encryption parameter set is included between every two first AMs. When the encryption parameter set includes a plurality of encryption parameters, the plurality of encryption parameters may be continuous or may be discontinuous. In other words, other information may be inserted between the plurality of encryption parameters, for example, a ciphertext data segment, padding information, or the like.

In an implementation method, the encryption parameter set in each AM periodicity includes one or more of the following (1) to (4):

(1) An encryption type. The encryption type identifies whether encryption is performed.

In an implementation, the encryption type identifies whether a data segment in an AM periodicity in which the encryption type is located is encrypted. For example, with reference to FIG. 9, in a specific example, an encryption parameter set in the $X^{th}$ AM periodicity includes the encryption type, and the encryption type identifies that a data segment in the $X^{th}$ AM periodicity is the encrypted data segment.

In another implementation, the encryption type identifies whether a data segment in another periodicity other than an AM periodicity in which the encryption type is located is encrypted. For example, with reference to FIG. 9, in a specific example, an encryption parameter set in the $X^{th}$ AM periodicity includes the encryption type, and the encryption type identifies that a data segment in the $(X+1)^{th}$ AM periodicity is the encrypted data segment. (2) A key identification, where the key identification indicates an encryption key used by a first ciphertext data segment.

The first ciphertext data segment herein refers to ciphertext data encrypted by using a key indicated by the key identification.

In an implementation, the first ciphertext data segment and the key identification are located in a same AM periodicity. In other words, the key indicated by the key identification acts on a ciphertext data segment in an AM periodicity in which the key identification is located. For example, with reference to FIG. 9, an encryption parameter set 1 in the $X^{th}$ AM periodicity includes the key identification, and the key indicated by the key identification is used to encrypt a ciphertext data segment 1 in the $X^{th}$ AM periodicity.

In another implementation, the first ciphertext data segment and the key identification are located in different AM periodicities. In other words, the key indicated by the key identification acts on the ciphertext data segment in another AM periodicity other than an AM periodicity in which the key identification is located. For example, with reference to FIG. 9, the encryption parameter set 1 in the $X^{th}$ AM periodicity includes the key identification, and the key indicated by the key identification is used to encrypt a ciphertext data segment 2 in the $(X+1)^{th}$ AM periodicity.

(3) An initialization vector (IV) identifier, where the initialization vector identification indicates an initialization vector used by a second ciphertext data segment.

The second ciphertext data segment is ciphertext data obtained by performing encryption by using an initialization vector indicated by the initialization vector identification.

First ciphertext data corresponding to a key identification in one encryption parameter set and second ciphertext data corresponding to an initialization vector identification in the encryption parameter set may be the same ciphertext data, or may be different ciphertext data.

In an implementation, the first ciphertext data segment and the initialization vector identification are located in a same AM periodicity. In other words, an initialization vector indicated by the initialization vector identification is a ciphertext data segment acting on an AM periodicity in which the initialization vector identification is located. It may also be understood that two first AMs adjacent to the second ciphertext data segment and two first AMs adjacent to the initialization vector identification are respectively the same. For example, with reference to FIG. 9, the encryption parameter set 1 in the $X^{th}$ AM periodicity includes the initialization vector identification, and the initialization vector indicated by the initialization vector identification is used to encrypt the ciphertext data segment 1 in the $X^{th}$ AM periodicity.

In another implementation, the first ciphertext data segment and the initialization vector identification are located in different AM periodicities. In other words, the initialization vector indicated by the initialization vector identification is a ciphertext data segment acting on another AM periodicity other than the AM periodicity in which the initialization vector identification is located. For example, with reference to FIG. 9, the encryption parameter set 1 in the $X^{th}$ AM periodicity includes the initialization vector identification, and the initialization vector indicated by the initialization vector identification is used to encrypt the ciphertext data segment 2 in the $(X+1)^{th}$ AM periodicity.

(4) Integrity Check Value.

In an implementation method, integrity check is performed on a ciphertext data segment between two first AMs that are adjacent to the integrity check values. For example, with reference to FIG. 9, the encryption parameter set 1 in the $X^{th}$ AM periodicity includes the integrity check value, and the integrity check value is used to perform integrity check on the ciphertext data segment 1 in the $X^{th}$ AM periodicity.

In another implementation, the integrity check value is used to perform integrity check on the ciphertext data segment between two first AMs before the integrity check value. For example, with reference to FIG. 9, the encryption parameter set 2 in the $(X+1)^{th}$ AM periodicity includes the integrity check value, and the integrity check value is used to perform integrity check on the ciphertext data segment 1 in the $X^{th}$ AM periodicity. For another example, with reference to FIG. 9, the encryption parameter set 2 in the $(X+1)^{th}$ AM periodicity includes the integrity check value, and the integrity check value is used to perform integrity check on a ciphertext data segment in the $(X-1)^{th}$ AM periodicity (not shown in the figure). For another example, with reference to FIG. 9, the encryption parameter set 2 in the $(X+1)^{th}$ AM periodicity includes the integrity check value, and the integrity check value is used to perform integrity check on a ciphertext data segment in the $(X-2)^{th}$ AM periodicity (not shown in the figure), and the like.

6. Padding Information

The padding information refers to the bit information formed by one or more bits. In one ciphertext data flow, one piece of padding information may be inserted between every two first AMs or the padding information is not inserted. When the padding information needs to be inserted, a quantity of bits of the inserted padding information needs to meet a specified condition. For example, after the padding information is inserted, it is ensured that an AM is always located at a beginning of an FEC codeword during FEC encoding, so that a decryption side performs FEC decoding after identifying the AM.

For a specific calculation manner of the quantity of bits of the padding information, refer to the following description.

Figure 8:
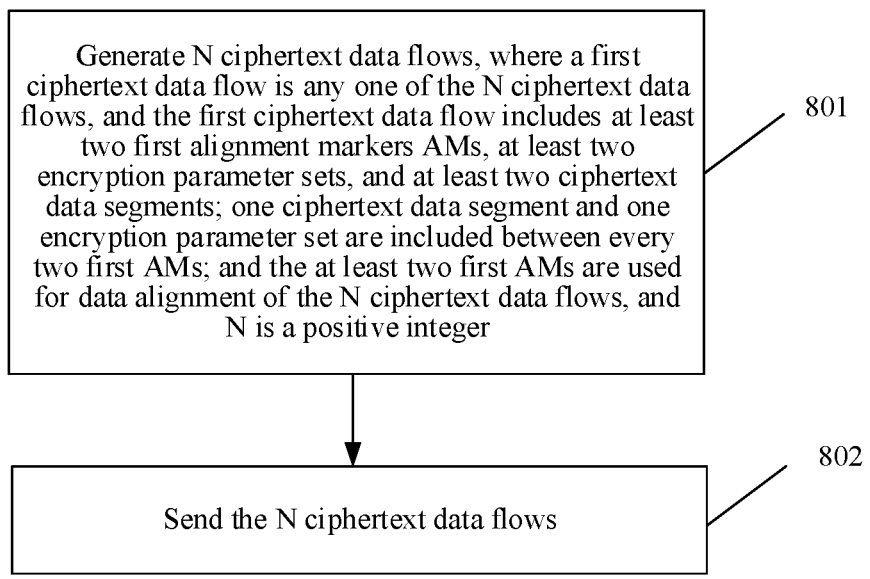
FIG. 8 is a schematic diagram of a data transmission method according to an embodiment of this application.

FIG. 8 is a schematic diagram of a data transmission method according to an embodiment of this application. The method may be performed by a flexible pluggable optical module on a sending side or by a physical layer of a network device on a sending side. The method relates to implementation of a data encryption function.

The method includes the following steps.

Step 801. Generate N ciphertext data flows.

Step 802. Send the N ciphertext data flows.

Based on the solution, an encryption parameter and ciphertext data are sent through N data flows. The method may be applied to a physical layer of an optical module or a network device. Therefore, an encryption parameter that is sent through the N data flows does not use a user service bandwidth, a data transmission volume is increased, and a data sending rate is further increased. In addition, a bit stream at the physical layer is encrypted, and all bits (including a source MAC address and a destination MAC address) in a user frame are encrypted. Therefore, address information is not exposed, and security may be improved.

In an implementation, in step 801, the N ciphertext data flows may be generated based on the following steps: obtaining N plaintext data flows; and generating the first ciphertext data flow based on the first plaintext data flow and the at least two encryption parameter sets.

In an implementation, when the data transmission method is applied to an optical module, the optical module may obtain the N plaintext data flows by receiving M physical lane signals, where M is a positive integer; and converting the M physical lane signals into the N plaintext data flows based on the specified proportion.

In an implementation, a method for generating the first ciphertext data flow based on the first plaintext data flow and the at least two encryption parameter sets may include: encrypting the first plaintext data segment based on the first encryption parameter set, to obtain the third ciphertext data segment; and inserting the first encryption parameter set into the first plaintext data flow, to obtain the first ciphertext data flow. The first plaintext data segment is any one of the first plaintext data flow, and the third ciphertext data segment is a ciphertext data segment obtained by encrypting the first plaintext data segment by using the first encryption parameter set. For example, with reference to FIG. 9 and FIG. 10, the plaintext data segment 1 in the $X^{th}$ AM periodicity may be encrypted by using the encryption parameter set 1, to obtain the ciphertext data segment 1, and then the encryption parameter set 1 is inserted into the $X^{th}$ AM periodicity. In this way, the first AM, the encryption parameter set 1, and the ciphertext data segment 1 in the $X^{th}$ AM periodicity are obtained, where the first AM is the same as the second AM.

In an implementation, the inserting of the first encryption parameter set into the first plaintext data flow to obtain the first ciphertext data flow may include: inserting the first encryption parameter set into the first plaintext data flow, to obtain a second ciphertext data flow; and performing forward error correction encoding or performing scrambling and forward error correction encoding on the second ciphertext data flow, to obtain the first ciphertext data flow. In other words, after each plaintext data flow is encrypted to obtain the ciphertext data flow, the method further includes an operation of separately performing forward error correction encoding or performing scrambling and forward error correction encoding on each ciphertext data flow.

In another implementation, the inserting of the first encryption parameter set into the first plaintext data flow to obtain the first ciphertext data flow includes: separately inserting the first encryption parameter set into N first plaintext data flows, to obtain N third ciphertext data flows; converting the N third ciphertext data flows into at least one serial ciphertext data flow based on a specified proportion; performing forward error correction encoding or performing scrambling and forward error correction encoding on the at least one serial ciphertext data flow, to obtain at least one encoded serial ciphertext data flow; and converting the at least one encoded serial ciphertext data flow into N first ciphertext data flows. In other words, after each plaintext data flow is encrypted to obtain a ciphertext data flow, the N encrypted ciphertext data flows are further converted into one or more serial ciphertext data flows. Then forward error correction encoding is performed on the one or more serial ciphertext data flows, or scrambling and forward error correction encoding are performed on the one or more serial ciphertext data flows, and then the one or more serial ciphertext data flows are converted into the N ciphertext data flows.

The foregoing describes various implementations of encrypting a plaintext data flow to obtain the ciphertext data flow. With reference to the foregoing solution, to ensure that the AM is always located at the beginning of an FEC codeword during FEC encoding, to facilitate FEC decoding after the decryption side identifies the AM. In embodiments of this application, padding information (may be encrypted padding information or unencrypted padding information) of corresponding bits may be inserted into each AM periodicity of each encrypted ciphertext data flow. In other words, the first ciphertext data flow in the N ciphertext data flows further includes at least two pieces of padding information, and each AM periodicity carries one piece of padding information. Optionally, one piece of padding information is included between every two first AMs, one piece of padding information is further included between every two ciphertext data segments, and one first AM, one ciphertext data segment, and one encryption parameter set are included between every two pieces of padding information. For example, with reference to FIG. 9, one piece of padding information is inserted between the ciphertext data segment and the encryption parameter set in each AM periodicity.

In an implementation, the encryption parameter set in the first ciphertext data flow is used to encrypt the ciphertext data segment in the first ciphertext data flow.

In another implementation, the encryption parameter set in the first ciphertext data flow is used to encrypt the ciphertext data segment and the padding information in the first ciphertext data flow. For example, with reference to FIG. 9 and FIG. 10, the plaintext data segment 1 and the padding information 1 may be encrypted by using the encryption parameter set 1, to obtain the ciphertext data segment 1 and the encrypted padding information 1. Then, the encrypted padding information 1 and the encryption parameter set 1 are inserted into the $X^{th}$ AM periodicity.

In an implementation method, a quantity of bits of padding information between two adjacent first AMs may be determined based on a quantity of bits spaced between the two adjacent first AMs and a quantity of bits in the encryption parameter set between the two adjacent first AMs. For example, the quantity of bits of the padding information between the two adjacent first AMs may be determined through the following formula:

(Y+a+P) mod Q=0, where Y is the quantity of bits spaced between the two adjacent first AMs, a is the quantity of bits in the encryption parameter set between the two adjacent first AMs, p is the quantity of bits of the padding information between the two adjacent first AMs, Q is a quantity of bits included in one forward error correction codeword, and mod is a modulo operation.

Optionally, P is a minimum value that meets the formula.

Figure 11:
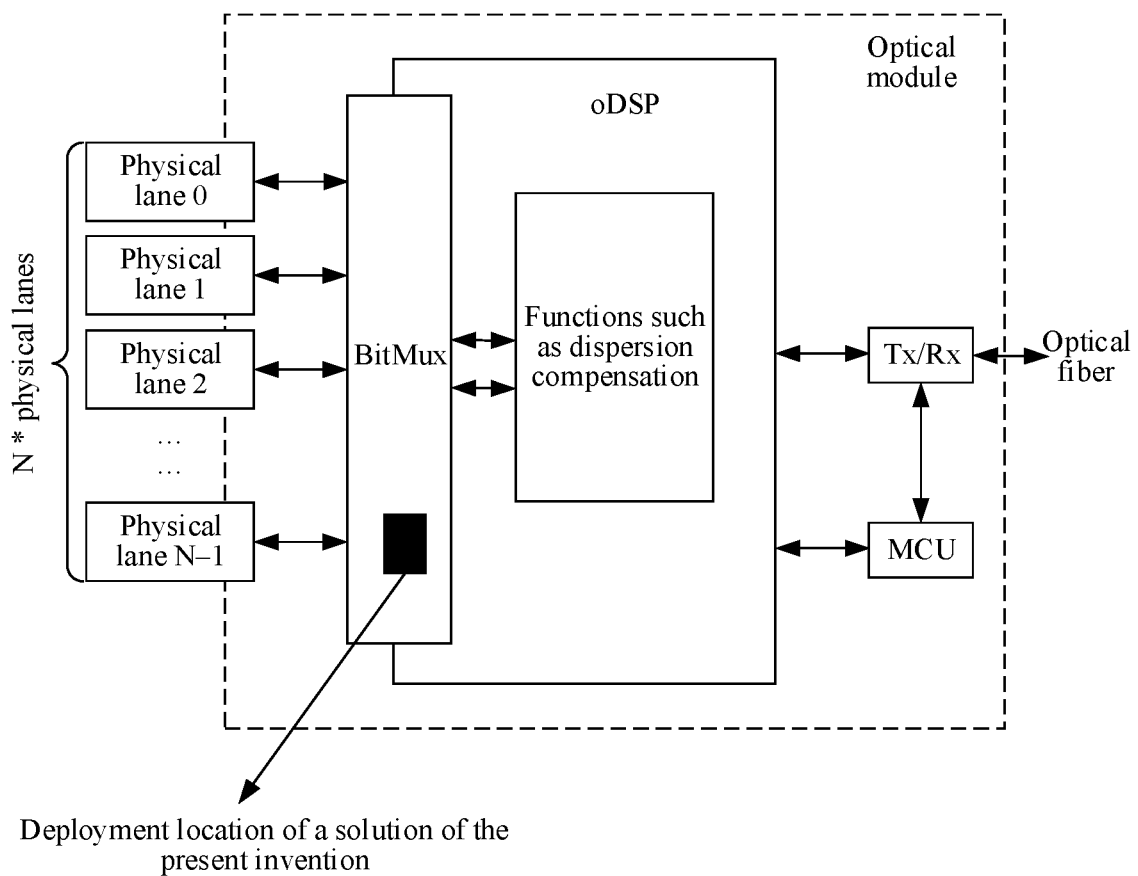
FIG. 11 is a schematic diagram of a deployment location of a solution deployed on an optical module according to an embodiment of this application.

For example, when the optical module is applied in the foregoing encryption-based data transmission method on the sending side, FIG. 11 is a schematic diagram of a deployment location on an optical module according to an embodiment of this application. The solution in embodiments of this application may be implemented in an optical module that supports an Ethernet connection. A micro controller unit (micro controller unit, MCU) in the optical module is responsible for configuring parameters of each functional module. For example, the MCU may be configured to configure an initialization parameter required for encryption and decryption, including starting or suspending an encryption and decryption function, and configuring key information such as a key negotiated by an upper layer. With reference to the optical module architecture shown in FIG. 11, by using an apparatus architecture in embodiments of this application, a BitMUX between K lanes (K is a positive integer) in an optical digital signal processor (oDSP) and M physical lanes (M is a positive integer) may be divided into two, namely, two bitMUXs such as M: N and N: K. N is a quantity of logic lanes, and N is a positive integer. Then encryption and decryption and corresponding functional modules are introduced between the two BitMUXs.

Figure 12:
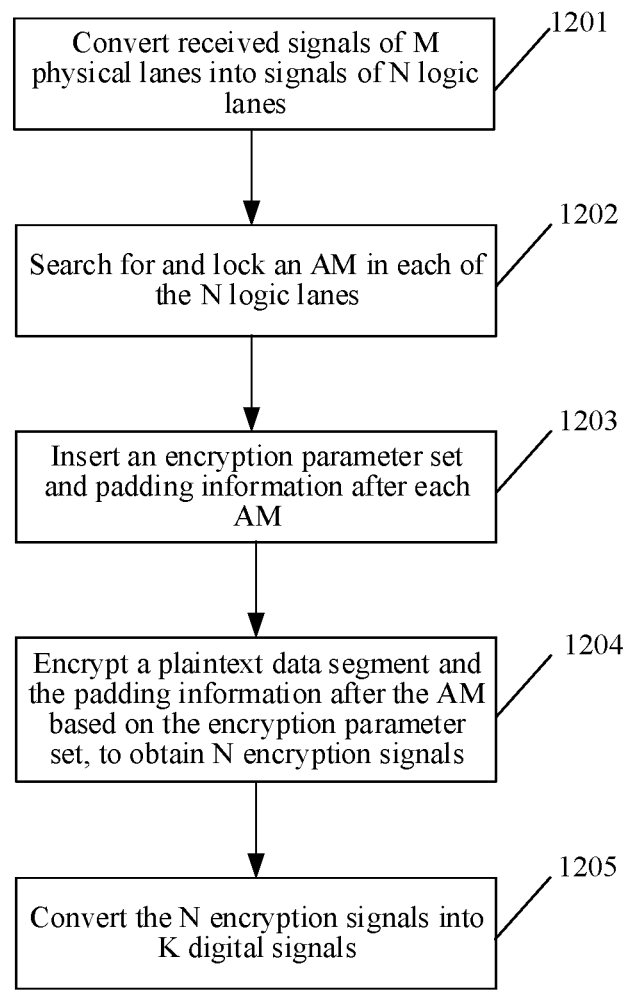
FIG. 12 is a schematic diagram of a data transmission method according to an embodiment of this application.
Figure 13A:
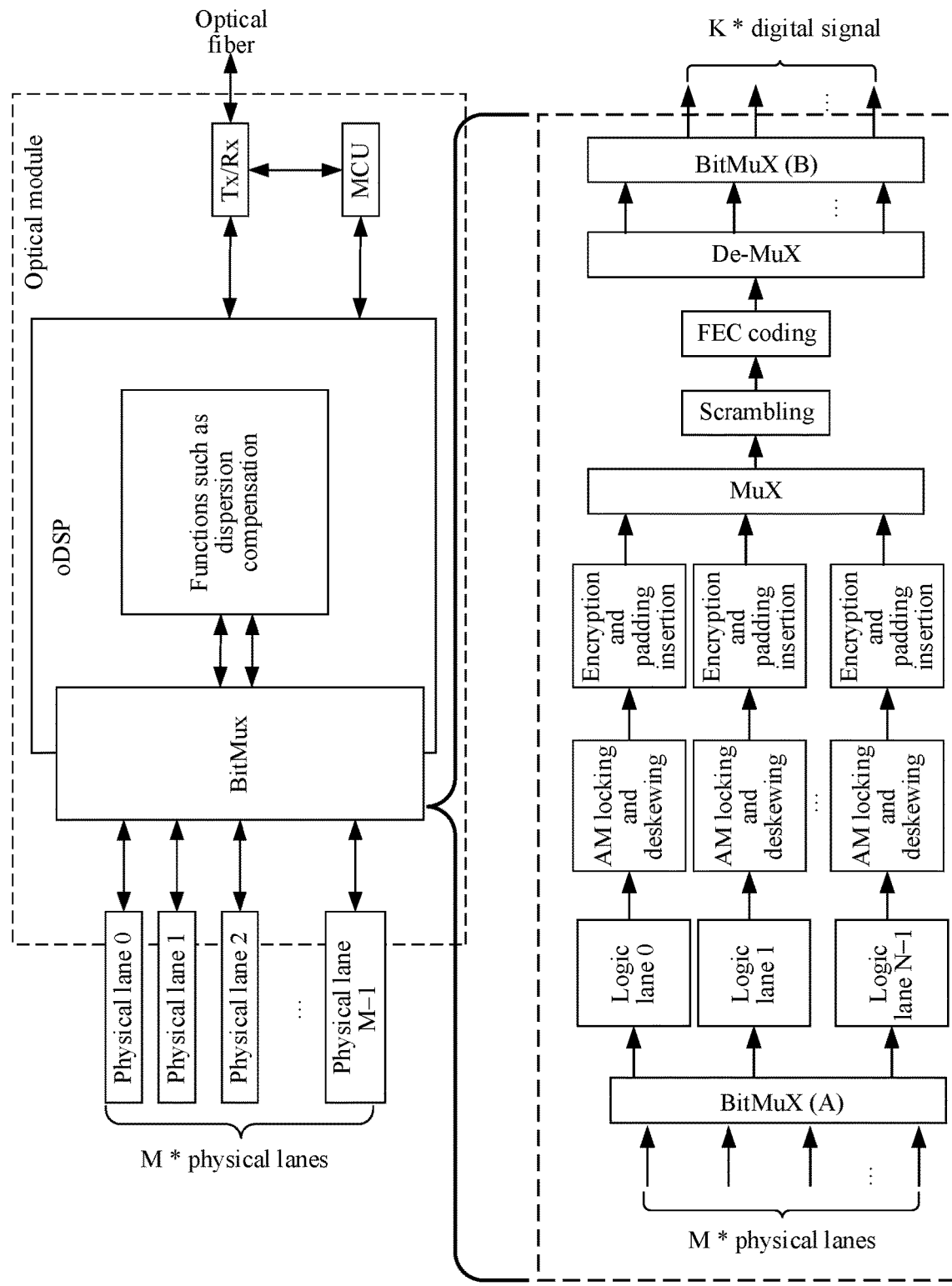
FIG. 13A is a schematic diagram of a structure of implementing an encryption function by an optical module.
Figure 13B:
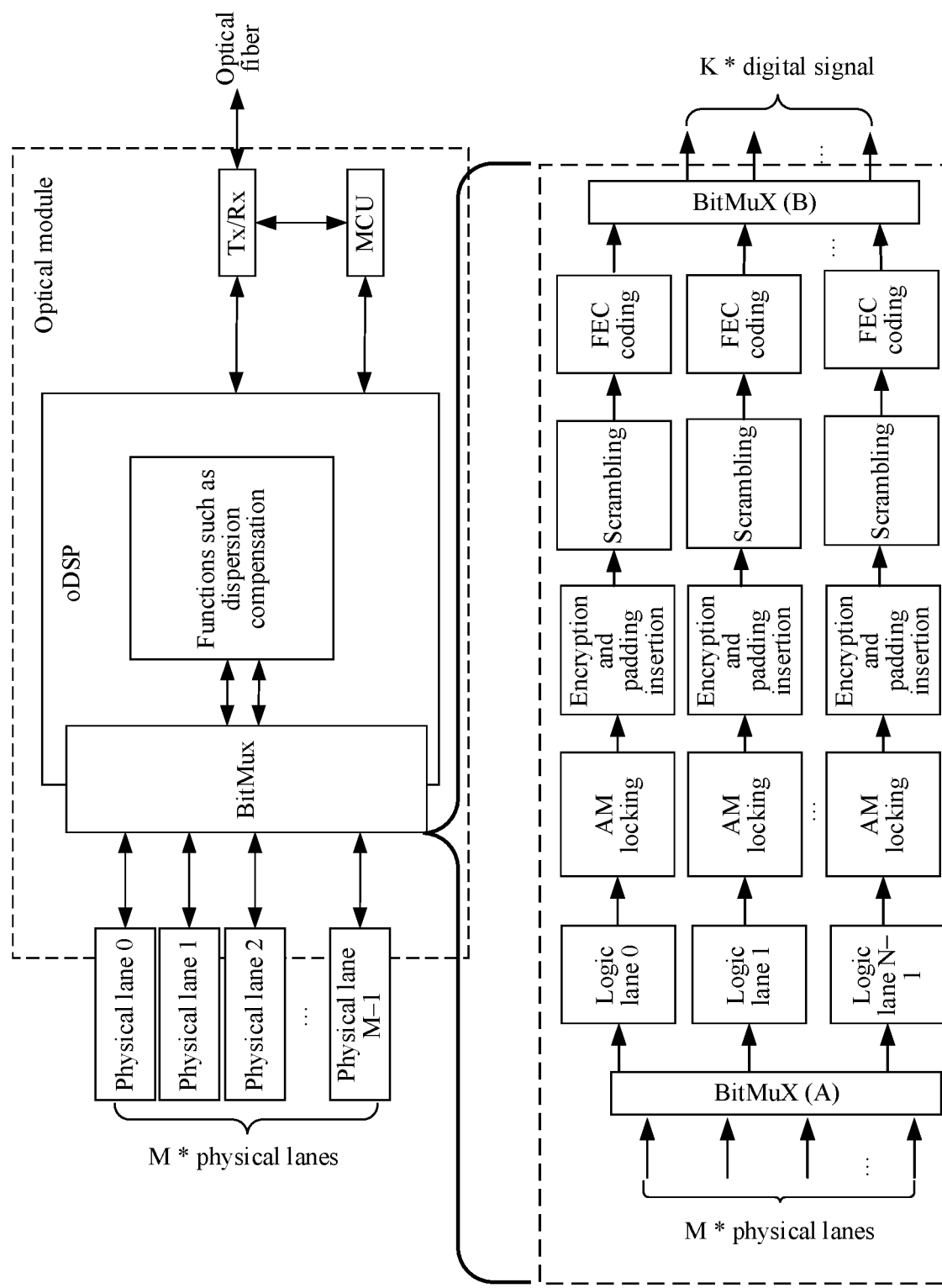
FIG. 13B is a schematic diagram of another structure of implementing an encryption function by an optical module.

FIG. 12 is a schematic diagram of a data transmission method according to an embodiment of this application. The method may be performed by a flexible pluggable optical module on a sending side. The method is a specific example of an embodiment corresponding to FIG. 8. FIG. 13A and FIG. 13B are schematic diagrams of structures of implementing an encryption function by an optical module.

With reference to FIG. 12, the method includes the following steps.

Step 1201. Convert received signals of M physical lanes into signals of N logic lanes.

With reference to FIG. 13A or FIG. 13B, the signals of the M physical lanes are converted into the signals of the N logic lanes through a BitMuX (A).

A signal of each logic lane corresponds to one plaintext data flow.

Step 1202. Search for and lock an AM in each of the N logic lanes.

For example, each logic lane separately searches for the AM, and locks the AM at a specified interval (spacings of an alignment unit are different based on Ethernet MAC/PHY at different rates) and then deskewing is performed.

FIG. 5 is used as an example for description.

Search for an AM: In a bit stream received by each lane (represented by an array X [0:]), a 120-bit code block of X

[0:119] is selected, to match CM0, CM1, CM2, CM3, CM4, and CM5 (6 bytes, and 12 nibbles) defined in FIG. 5. If a quantity of unmatched nibbles (nibbles) is less than or equal to 3, the matching succeeds. If the matching fails, a 120-bit code block of X [1:120] is used for matching, and the reset can be deduced by analogy.

AM locking: After an AM is matched, matching is performed from the 120-bit starting from the $2785280^{th}$ bit after a current location. If the matching succeeds, it indicates that the AM is locked.

Lane deskewing: After AMs of sixteen lanes are locked, the sixteen lanes are deskewed, to eliminate deviation between different lanes and achieve lane alignment.

Step 1203. Insert an encryption parameter set and padding information (Pad) after each AM.

For example, the inserted encryption parameter set includes one or more of the following: an encryption type, a key identification, an IV, or an ICV. The encryption type identifies whether encryption is performed, the key identification indicates a used encryption key, the IV is an encryption parameter used in an encryption process, and the ICV is used by a receiving end to perform integrity check on encrypted data.

Figure 14:
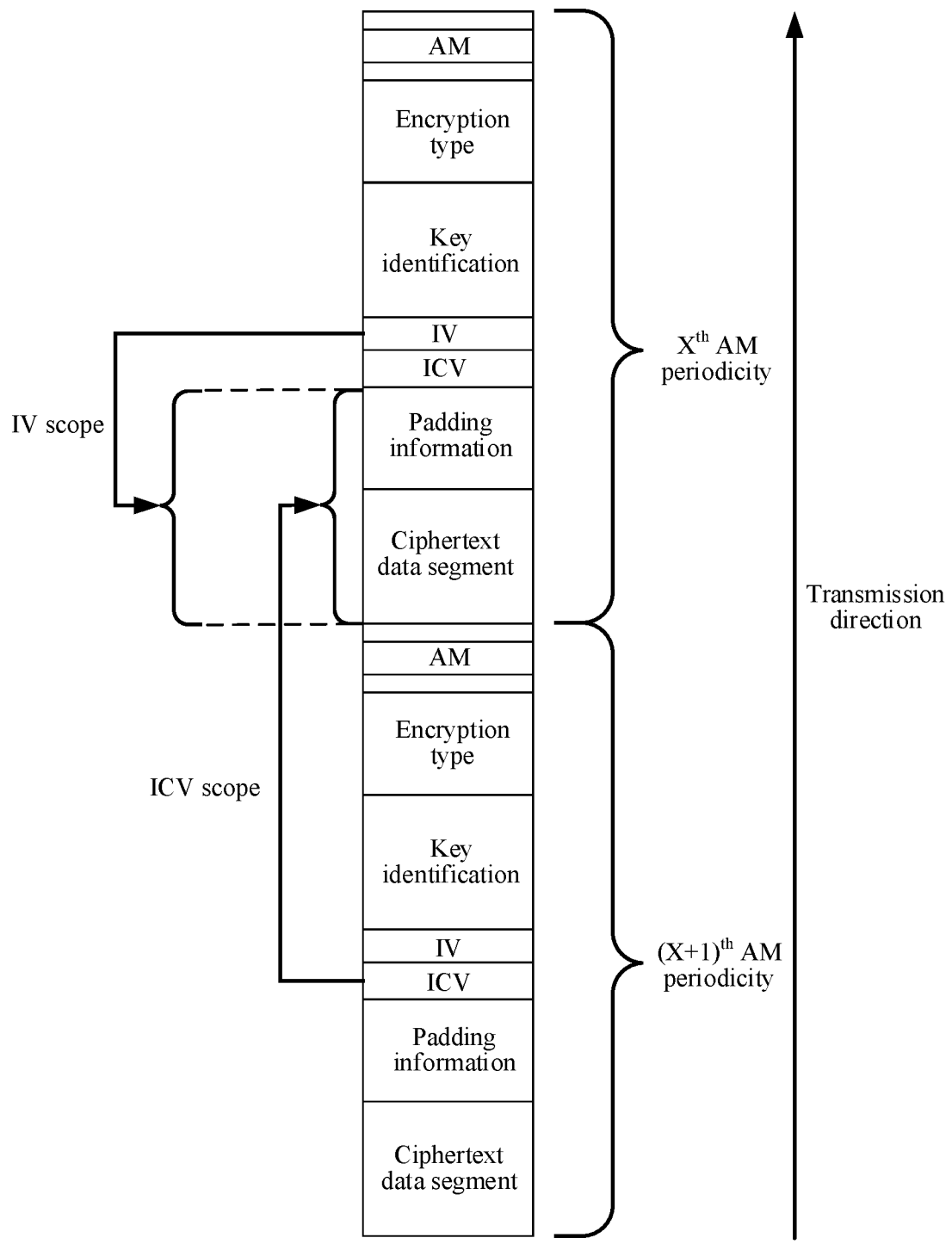
FIG. 14 is a schematic diagram of an inserted encryption parameter set and padding information.

FIG. 14 is a schematic diagram of an inserted encryption parameter set and padding information. The encryption parameter set in each AM periodicity includes an encryption type, a key identification, an IV, and an ICV.

Optionally, an IV in one AM periodicity acts on a ciphertext data segment and padding information in the AM periodicity. The padding information herein is encrypted padding information.

Optionally, an ICV in one AM periodicity acts on a ciphertext data segment and padding information in a previous AM periodicity of the AM periodicity. The padding information herein is encrypted padding information. In other words, during decryption, the receiving end performs integrity check on a ciphertext data segment and padding information in the $X^{th}$ AM periodicity by using an ICV in the $(X+1)^{th}$ AM periodicity.

It should be noted that to ensure that the AM is always located at a beginning of an FEC codeword, a size of padding information inserted in each AM periodicity needs to meet a specific condition.

It is assumed that before encryption is performed, a quantity of bits spaced between two AMs is Y, and the selected FEC is RS (n, k, m), where n is a quantity of symbols included in one FEC codeword after encoding, k is a quantity of data symbols included in one FEC codeword, m is a quantity of bits included in one symbol, k*m is a quantity of bits included in one FEC codeword, and mod is a modulo operation. If a quantity of bits of the inserted Pad is P, and a quantity of bits in the encryption parameter set is a, P may be a minimum value that meets the following conditions:

$$(Y+a+P) \mod(k*m)=0$$

The following provides description with reference to a specific example.

Example 1

MACSEC supports an integrity check function. To align with the MAC, the solution implements encryption and decryption at a physical layer and also needs to support an integrity check function. Because there may be a bit error on a link, integrity protection needs to be performed. The FEC may be used to correct the bit error generated on the link before integrity check is performed.

Using an Ethernet MAC/PHY/optical module of 400 G as an example, a technical solution of the present disclosure is implemented at an electrical layer in the optical module, and the physical lane is eight lanes of 50 Gbps (N=8). There are two lanes (K=2) of electrical layers and oDSP-related supplementary functions in the optical module.

A commonly used advanced encryption standard (AES)-galois/counter mode (GCM) is used in an algorithm.

In an example, each logic lane independently accomplishes locking an AM, encryption and decryption, and insertion or extraction of an encryption parameter, which are independent of each other. For a rate of 400 Gbps, there are sixteen logic lanes (M=16) altogether.

A type domain is selected to be 32 bits, which is used to distinguish a common non-encrypted AM (Type=00H) from an encrypted AM (Type=01H). The key index domain is selected to be 8 bits. If a change of a value means a change of a key, for example, from "00000001" to "000000010", a decryption side needs to select a new key to perform decryption. A length of the IV is 12 bytes (namely, 96 bits), and a length of the ICV is 16 bytes (namely, 128 bits).

To ensure that the AM is always at a beginning of the FEC codeword, a pad with P bits needs to be inserted. For 400 G, a quantity of bits spaced between two AM groups is Y=278528*10, a selected FEC is RS (544, 514, 10), and a quantity of data symbols included in one FEC codeword is k=514. If a quantity m of bits included in one symbol is 10, P may be a minimum value that meets the following condition:

$$(278528*10+32+8+128+96+P) \mod(514*10)=0$$

P=336 bits are obtained through calculation.

Example 2

MACSEC supports an integrity check function. To align with the MAC, encryption and decryption are implemented at a physical layer and also are required support an integrity check function. Because there is a bit error on a link, integrity protection needs to be performed. The FEC may be used to correct the bit error generated on the link, and then integrity check may be performed.

Using an Ethernet MAC/PHY/optical module of 100 G as an example, a technical solution of the present disclosure is implemented at an electrical layer in the optical module, and the physical lane is four lanes of 50 Gbps (N=4). There are two lanes (K=2) of electrical layers and oDSP-related supplementary functions in the optical module.

The common AES-GCM is used in the algorithm.

In the example, each logic lane independently accomplishes locking an AM, encryption and decryption, and insertion or extraction of an encryption parameter, which are independent of each other. For a rate of 100 Gbps, there are four logic lanes (M=4) altogether.

A type domain is selected to be 32 bits, which is used to distinguish a common non-encrypted AM code block (Type=00H) from an encrypted AM code block (Type=01H). The key index domain is selected to be 8 bits. If a change of a value means a change of a key, for example, from "00000001" to "000000010", a decryption side needs to select a new key to perform decryption. A length of the IV is 12 bytes (namely, 96 bits), and a length of the ICV is 16 bytes (namely, 128 bits).

To ensure that the AM word is always at a beginning of the FEC codeword, a Pad with P bits needs to be inserted.

For 100 G, a quantity of bits spaced between two AM groups is Y=557056*10, a selected FEC is RS (544, 514, 10), and a quantity of data symbols included in one FEC codeword is k=514. If a quantity m of bits included in one symbol is 10, P may be a minimum value that meets the following condition:

$$(557056*10+32+8+128+96+P) \mod(514*10)=0$$

P=936 bits are obtained through calculation.

In embodiments of this application, the key identification may be configured and modified by the MCU. During the first startup, the IV may be configured by the MCU. Then, the IV may be automatically generated based on a specific rule. For example, the IV is automatically generated by an encryption module, and is inserted by an AM locking module. A decryption module extracts a key identification and an IV.

In an implementation, in embodiments of this application, to ensure a decryption speed, an ICV of the $X^{th}$ AM periodicity is stored in an ICV field domain of the $(X+1)^{th}$ AM periodicity. When a signal of the $X^{th}$ AM periodicity is received, decryption is completed, and the ICV is calculated and stored. After the ICV of the $(X+1)^{th}$ AM periodicity is received, the stored ICV is compared with the received ICV. If the stored ICV and the received ICV are consistent, the integrity check succeeds. If the stored ICV and the received ICV are inconsistent, the integrity check fails, and an alarm signal may be generated.

Step 1204. Encrypt the plaintext data segment and the padding information after the AM based on the encryption parameter set, to obtain N encryption signals.

In an implementation, with reference to FIG. 13A or FIG. 13B, after encrypting data and the padding information after the AM, the method further includes: after a signal of each logic lane (including information such as a ciphertext data segment and an encryption parameter set) is aggregated into a serial code block flow through a Mux, performing scrambling (Scrambler) and FEC encoding (FEC Encode), and then forming the N encryption signals through a De-Mux.

In the method shown in FIG. 13A, encryption signals of Nlogic lanes are converted into one or more serial encryption signals through the Mux, and then scrambling and FEC encoding are performed on the one or more serial encryption signals. Then, the one or more serial encryption signals after scrambling and FEC encoding are converted into signals (namely, signals after encryption, scrambling, and FEC encoding) of the N logic lanes through the De-Mux.

In the method shown in FIG. 13B, scrambling and FEC encoding are separately performed on an encryption signal (or a data flow of each logic lane) of each logic lane, to obtain the signals (namely, the signals after encryption, scrambling, and FEC encoding) of the N logic lanes.

Step 1205. Convert N encryption signals into K digital signals.

With reference to FIG. 13A or FIG. 13B, M encryption signals are converted into K digital signals through a BitMuX (B), and then sent to the oDSP.

Based on the foregoing solution, encryption is performed in the optical module, which does not occupy a user service bandwidth, and therefore, a data transmission volume may be increased. The optical module is flexible and pluggable, and therefore, a corresponding quantity of optical modules may be configured based on an actual customer requirement, to avoid an increase of power consumption. In addition, a bit stream at the physical layer is encrypted, and all bits (including a source MAC address and a destination MAC address) in a user frame are encrypted. Therefore, address information is not exposed, and security is improved.

Figure 15:
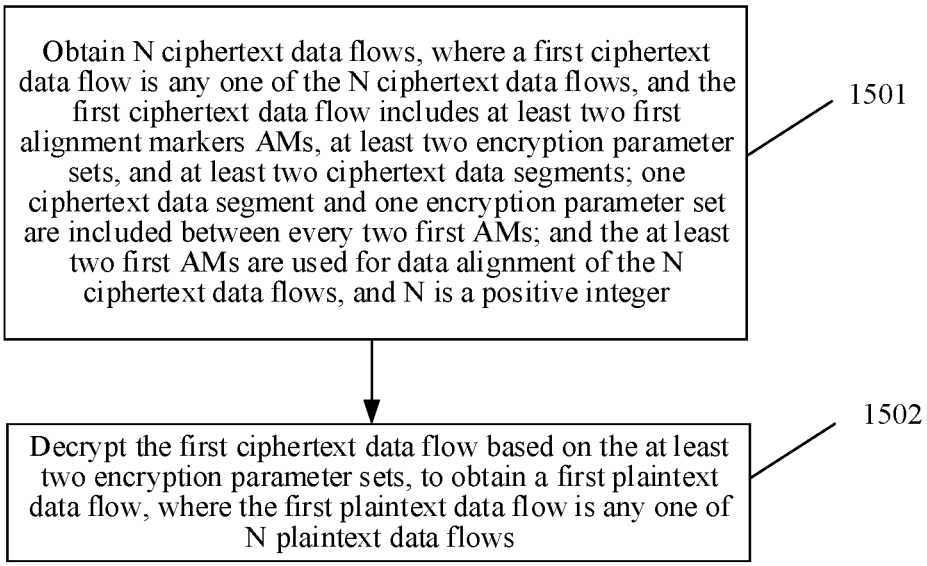
FIG. 15 is a schematic diagram of a data transmission method according to an embodiment of this application.

FIG. 15 is a schematic flowchart of a data transmission method according to an embodiment of this application. The method may be performed by a flexible pluggable optical module on a receiving side or by a physical layer of a network device on a receiving side. The method relates to implementation of a data decryption function.

The method includes the following steps.

Step 1501. Obtain N ciphertext data flows.

A first ciphertext data flow is any one of the N ciphertext data flows, and the first ciphertext data flow includes at least two first alignment markers (AMs), at least two encryption parameter sets, and at least two ciphertext data segments; one ciphertext data segment and one encryption parameter set are included between every two first AMs; and the at least two first AMs are used for data alignment of the N ciphertext data flows, and N is a positive integer.

Step 1502. Decrypt the first ciphertext data flow based on the at least two encryption parameter sets, to obtain a first plaintext data flow, where the first plaintext data flow is any one of N plaintext data flows.

In an embodiment, an encryption parameter and ciphertext data are sent through N data flows. The method may be applied to a physical layer of an optical module or a network device. Therefore, an encryption parameter that is sent through the N data flows does not use a user service bandwidth, a data transmission volume is increased, and a data sending rate is further increased. In addition, a bit stream at the physical layer is encrypted, and all bits (including a source MAC address and a destination MAC address) in a user frame are encrypted. Therefore, address information is not exposed, and security may be improved.

For various implementation methods of structures of the N plaintext data flows and the N ciphertext data flows, refer to related descriptions of the foregoing encryption side solution. Details are not described herein again.

In an implementation, the decrypting the first ciphertext data flow based on the at least two encryption parameter sets, to obtain a first plaintext data flow may be: decrypting the third ciphertext data segment based on the first encryption parameter set, to obtain the first plaintext data segment; and removing the first encryption parameter set from the first plaintext data flow, to obtain the first plaintext data flow. The first plaintext data segment is any one of the first plaintext data flow, and the third ciphertext data segment is a ciphertext data segment obtained by encrypting the first plaintext data segment by using the first encryption parameter set.

In an implementation, when the encryption side further performs forward error correction encoding or performs scrambling and forward error correction encoding while encrypting the N plaintext data flows, before decrypting the N ciphertext data flows, the decryption side further needs to perform forward error correction decoding or perform descrambling and forward error correction decoding on the N ciphertext data flows. An example method includes: performing forward error correction decoding or performing descrambling and forward error correction decoding on the first ciphertext data flow, to obtain a second ciphertext data flow; and then decrypting the third ciphertext data segment based on the first encryption parameter set, to obtain the first plaintext data segment. Another example method includes the following steps converting N first ciphertext data flows into at least one serial ciphertext data flow based on a specified proportion; performing forward error correction decoding or performing descrambling and forward error correction decoding on the at least one serial ciphertext data flow, to obtain at least one decoded serial ciphertext data flow; converting the at least one decoded serial ciphertext data flow into N third ciphertext data flows; and separately decrypting the third ciphertext data segment of the N third ciphertext data flows based on the first encryption parameter set, to obtain N first plaintext data segments.

It should be noted that when the sending side encrypts the plaintext data segment and the padding information, the receiving side needs to decrypt the ciphertext data segment and the encrypted padding information. In other words, if the padding information is encrypted, correspondingly, the padding information needs to be decrypted.

Figure 16:
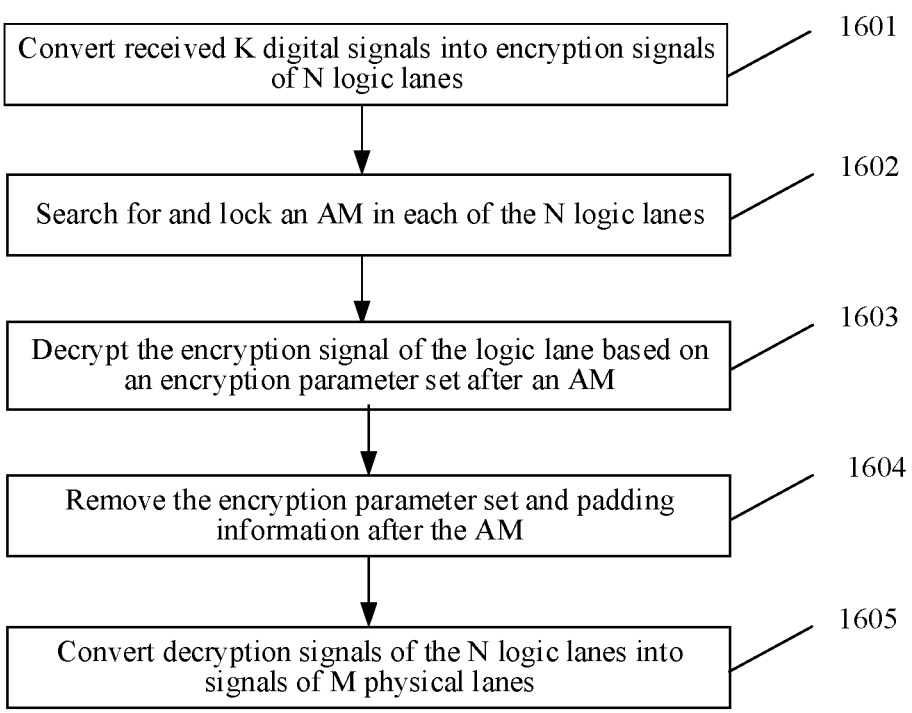
FIG. 16 is a schematic diagram of a data transmission method according to an embodiment of this application.
Figure 17A:
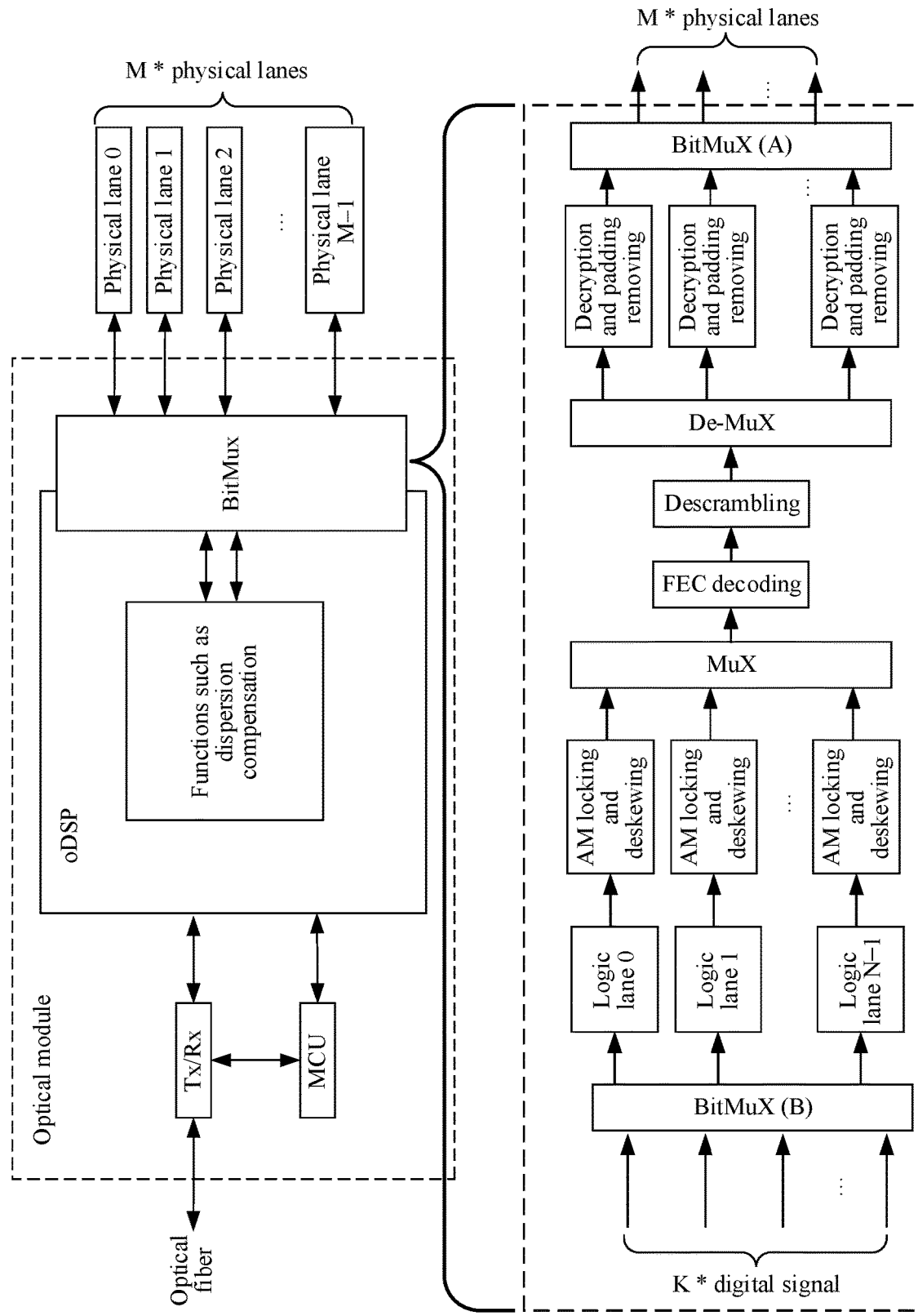
FIG. 17A is a schematic diagram of a structure of implementing a decryption function by an optical module.
Figure 17B:
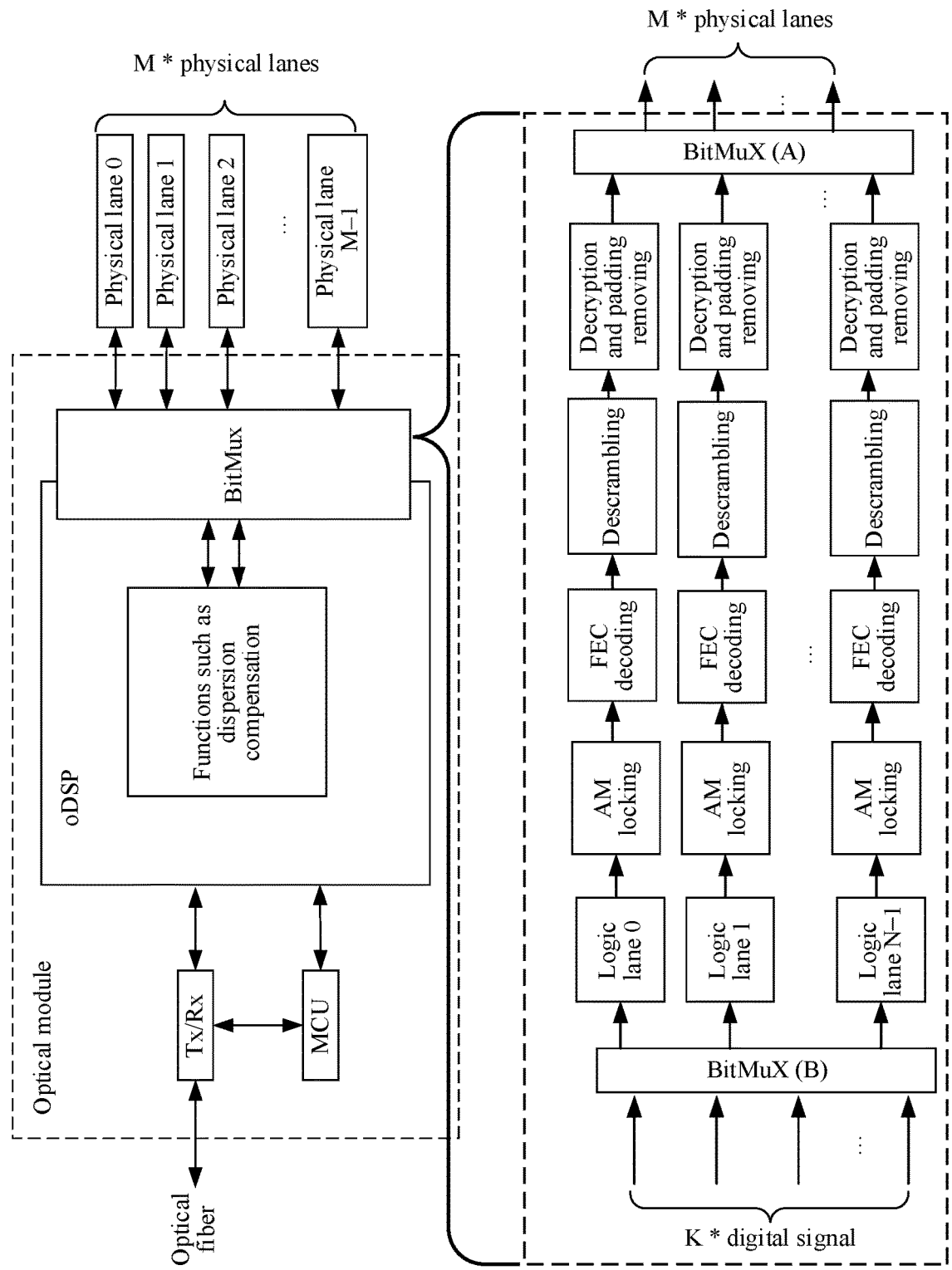
FIG. 17B is a schematic diagram of another structure of implementing a decryption function by an optical module.

FIG. 16 is a schematic diagram of a data transmission method according to an embodiment of this application. The method may be performed by a flexible pluggable optical module on a receiving side. The method is an example of an embodiment corresponding to FIG. 15. FIG. 17A and FIG. 17B are schematic diagrams of structures of implementing a decryption function by an optical module. The structure shown in FIG. 17A or FIG. 17B may be used together with the structure shown in FIG. 13A or FIG. 13B, to respectively implement an encryption function and a decryption function.

With reference to FIG. 16, a data transmission method includes the following steps.

Step 1601. Convert received K digital signals into encryption signals of N logic lanes.

With reference to FIG. 17A or FIG. 17B, the K digital signals are converted into the encryption signals of the N logic lanes through a BitMuX (A).

Step 1602. Search for and lock an AM in each of the N logic lanes.

For example, each logic lane separately searches for the AM, and locks (Lock) the AM at a specified interval (spacings of an alignment unit are different based on Ethernet MAC/PHY at different rates) and then deskewing is performed.

Step 1603. Decrypt the encryption signal of the logic lane based on an encryption parameter set after an AM, to obtain decryption signals of the N logical logic lanes.

For example, for a signal of each logic lane, whether data of a current AM periodicity is encrypted is determined through a type domain in the encryption parameter. If the data is encrypted, the encryption parameter is extracted for decryption, and the ICV is calculated and stored. When an ICV of a next AM periodicity is received, the stored ICV is compared with the received ICV, to determine whether the stored ICV and the received ICV are consistent. If the stored ICV and the received ICV are consistent, the integrity check succeeds. If the stored ICV and the received ICV are inconsistent, the integrity check fails, and an alarm signal may be generated.

Optionally, an implementation method for decrypting the encryption signal of the logic lane based on the encryption parameter set after the AM, to obtain the decryption signals of the N logic lanes includes: with reference to FIG. 17A, signals of N logic lanes are aggregated into one or more serial signal flows through a Mux, and then FEC decoding (FEC Decode) and descrambling are performed, and then the signals of the N logic lanes are converted into encryption signals of the N logic lanes through a De-Mux, and then decryption and padding removing are respectively performed on the encryption signals of the N logic lanes, to obtain decryption signals of the N logic lanes.

Optionally, another implementation method for decrypting the encryption signal of the logic lane based on the encryption parameter set after the AM, to obtain the decryption signals of the N logic lanes includes: with reference to FIG. 17B, FEC decoding, descrambling, decryption, and padding removing are respectively performed on a signal of each logic lane, to obtain the signals of the N logic lanes.

Step 1604. Remove the encryption parameter set and the padding information after the AM.

Step 1605. Convert decryption signals of the N logic lanes into signals of M physical lanes.

With reference to FIG. 17A or FIG. 17B, signals of M logic lanes are converted into signals of N physical lanes through a BitMuX (B).

Based on the foregoing solution, decryption is performed in the optical module, which does not use a user service bandwidth, and therefore, a data transmission volume may be increased. The optical module is flexible and pluggable, therefore, a corresponding quantity of optical modules may be configured based on an actual customer requirement, to avoid an increase of power consumption. In addition, a bit stream at the physical layer is encrypted, and all bits (including a source MAC address and a destination MAC address) in a user frame are encrypted. Therefore, address information is not exposed, and security is improved.

When embodiments of this application are applied to the optical module, a framework that carries an encryption and decryption parameter is designed based on an AM of a virtual lane, to implement the encryption and decryption function in the module. The encryption side performs FEC encoding after encryption, and the decryption side performs decryption after FEC decoding. FEC has an error correction capability to prevent the impact of a link bit error on the ICV. Therefore, ICV check for integrity protection is supported. An original BitMUX structure is divided into two parts, and is inserted into the solution of the present disclosure without affecting other components in the module. Each virtual lane in the module independently implements encryption and decryption. A specific amount of padding information is inserted, to ensure that an AM word is always at a beginning of an FEC codeword after FEC encoding.

With reference to FIG. 11 to FIG. 14, the foregoing describes a specific implementation process of applying the encryption solution in the embodiment corresponding to FIG. 8 to the optical module. In another implementation method, the encryption solution in the embodiment corresponding to FIG. 8 may be further applied to a physical layer of the network device. The following provides a description with reference to FIG. 3.

With reference to FIG. 3, after an AM group is inserted, one serial plaintext data flow is obtained, N serial plaintext data flows are generated based on one serial plaintext data flow, and the N serial plaintext data flows are separately encrypted to obtain N ciphertext data flows. Then, the N ciphertext data flows are aggregated into one serial ciphertext data flow, and then one ciphertext data flow is converted into two serial ciphertext data flows through distribution 1. After Reed-Solomon coding is performed on the two serial ciphertext data flows, the two encoded serial ciphertext data flows are converted into eight ciphertext data flows through distribution 2, and then the eight ciphertext data flows are converted into signals of M physical lanes through the PMA.

With reference to FIG. 11, FIG. 16, and FIG. 17A (or FIG. 17B), a specific implementation process of applying the decryption solution in the embodiment corresponding to FIG. 15 to the optical module is described above. In another implementation method, the decryption solution in the embodiment corresponding to FIG. 15 may be further applied to a physical layer of the network device. The following provides a description with reference to FIG. 3.

With reference to FIG. 3, after encryption signals of M physical lanes are received, eight ciphertext data flows are converted through the PMA, and then two serial ciphertext data flows are obtained after operations such as AM locking, dejittering (namely, deskewing), lane reordering, and deinterleaving are performed. Then, after Reed-Solomon decoding is performed on the two serial ciphertext data flows, interleaving is performed, to obtain one serial ciphertext data flow. Then, one serial ciphertext data flow is converted into N ciphertext data flows, and the N ciphertext data flows are respectively decrypted to obtain N plaintext data flows. Then, the N plaintext data flows are converted into one serial plaintext data flow, and are moved out through the AM group.

Figure 18:
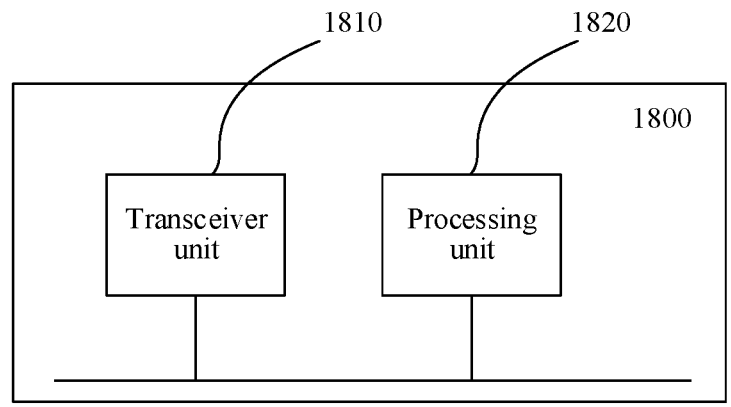
FIG. 18 is a schematic diagram of a communication apparatus according to an embodiment of this application.

FIG. 18 is a schematic diagram of a communication apparatus according to an embodiment of this application. The apparatus is configured to implement steps performed by a corresponding communication apparatus in the foregoing embodiment. As shown in FIG. 18, the apparatus 1800 includes a transceiver unit 1810 and a processing unit 1820.

In a first embodiment, the communication apparatus is applied to an optical module or a network device, and is configured to implement an encryption function.

A processing unit 1820 is configured to generate N ciphertext data flows, where a first ciphertext data flow is any one of the N ciphertext data flows, the first ciphertext data flow includes at least two first alignment markers AMs, at least two encryption parameter sets, and at least two ciphertext data segments, one ciphertext data segment and one encryption parameter set are included between every two first AMs, the at least two first AMs are used for data alignment of the N ciphertext data flows, and N is a positive integer. The transceiver unit 1810 is configured to send the N ciphertext data flows.

In a possible implementation method, the encryption parameter set includes one or more of the following:
an encryption type, where the encryption type identifies whether encryption is performed;
a key identification, where the key identification indicates an encryption key used by a first ciphertext data segment; and
an initialization vector identification, where the initialization vector identification indicates an initialization vector used by a second ciphertext data segment.

In a possible implementation method, two first AMs adjacent to the second ciphertext data segment and two first AMs adjacent to the initialization vector identification are respectively the same.

In a possible implementation method, the encryption parameter set further includes an integrity check value, and the integrity check value is used to perform integrity check on a ciphertext data segment between the two first AMs before the integrity check value.

In a possible implementation method, the processing unit 1820 is configured to obtain N plaintext data flows. A first plaintext data flow is any one of the N plaintext data flows, the first plaintext data flow includes at least two second AMs and at least two plaintext data segments, and the at least two second AMs are used for data alignment of the N plaintext data flows. One plaintext data segment is included between every two second AMs, and one second AM is included between every two plaintext data segments. The processing unit 1820 is configured to generate the first ciphertext data flow based on the first plaintext data flow and the at least two encryption parameter sets.

In a possible implementation method, a first plaintext data segment is any one of the at least two plaintext data segments, and a third ciphertext data segment is a ciphertext data segment obtained by encrypting the first plaintext data segment by using a first encryption parameter set in the at least two encryption parameter sets. The processing unit 1820 is configured to encrypt the first plaintext data segment based on the first encryption parameter set to obtain the third ciphertext data segment, and to insert the first encryption parameter set into the first plaintext data flow, to obtain the first ciphertext data flow.

In a possible implementation method, the processing unit 1820 is configured to insert the first encryption parameter set into the first plaintext data flow, to obtain a second ciphertext data flow; and performing forward error correction encoding or performing scrambling and forward error correction encoding on the second ciphertext data flow, to obtain the first ciphertext data flow.

In a possible implementation method, the processing unit 1820 is configured to separately insert the first encryption parameter set into N first plaintext data flows, to obtain N third ciphertext data flows; convert the N third ciphertext data flows into at least one serial ciphertext data flow based on a specified proportion; perform forward error correction encoding or performing scrambling and forward error correction encoding on the at least one serial ciphertext data flow, to obtain at least one encoded serial ciphertext data flow; and convert the at least one encoded serial ciphertext data flow into N first ciphertext data flows.

In a possible implementation method, the processing unit 1820 is configured to receive M physical lane signals through the transceiver unit 1810, where M is a positive integer; and converting the M physical lane signals into the N plaintext data flows based on the specified proportion.

In a possible implementation method, one first AM and one encryption parameter set are included between every two ciphertext data segments, and one first AM and one ciphertext data segment are included between every two encryption parameter sets; or one encryption parameter set between every two first AMs is divided into at least two encryption parameter subsets, and some or all encryption subsets in the at least two encryption parameter subsets are discontinuous.

In a possible implementation method, the processing unit 1820 is configured to insert the first encryption parameter set and padding information into the first plaintext data flow, to obtain the first ciphertext data flow.

In a possible implementation method, the padding information is padding information encrypted by using the first encryption parameter set.

In a possible implementation method, a quantity of bits of padding information between two adjacent first AMs is determined based on a quantity of bits spaced between the two adjacent first AMs and a quantity of bits in the encryption parameter set between the two adjacent first AMs.

In a possible implementation method, $(Y+a+P) \mod Q=0$, where Y is the quantity of bits spaced between the two adjacent first AMs, a is the quantity of bits in the encryption parameter set between the two adjacent first AMs, P is the quantity of bits of the padding information between the two adjacent first AMs, Q is a quantity of bits included in one forward error correction codeword, and mod is a modulo operation.

In a possible implementation method, P is a minimum value that meets the formula.

In a second embodiment, the communication apparatus is applied to an optical module or a network device, and is configured to implement a decryption function.

A transceiver unit 1810 is configured to obtain N ciphertext data flows, where a first ciphertext data flow is any one of the N ciphertext data flows, the first ciphertext data flow includes at least two first alignment markers AMs, at least two encryption parameter sets, and at least two ciphertext data segments, one ciphertext data segment and one encryption parameter set are included between every two first AMs, the at least two first AMs are used for data alignment of the N ciphertext data flows, and N is a positive integer. A processing unit 1820 is configured to decrypt the first ciphertext data flow based on the at least two encryption parameter sets, to obtain a first plaintext data flow, where the first plaintext data flow is any one of N plaintext data flows.

In a possible implementation method, the encryption parameter set includes one or more of the following:
- an encryption type, where the encryption type identifies whether encryption is performed;
- a key identification, where the key identification indicates an encryption key used by a first ciphertext data segment; and
- an initialization vector identification (IV), where the initialization vector (IV) identification indicates an initialization vector used by a second ciphertext data segment.

In a possible implementation method, two first AMs adjacent to the second ciphertext data segment and two first AMs adjacent to the initialization vector (IV) identification are respectively the same.

In a possible implementation method, the encryption parameter set further includes an integrity check value, and the integrity check value is used to perform integrity check on a ciphertext data segment between the two first AMs before the integrity check value.

In a possible implementation method, the first plaintext data flow includes at least two second AMs and at least two plaintext data segments, one plaintext data segment is included between every two second AMs, one second AM is included between every two plaintext data segments, and the at least two second AMs are used for data alignment of the N plaintext data flows.

In a possible implementation method, a first plaintext data segment is any one of the at least two plaintext data segments, and a third ciphertext data segment is a ciphertext data segment obtained by encrypting the first plaintext data segment by using a first encryption parameter set in the at least two encryption parameter sets; and the processing unit 1820 is configured to decrypt the third ciphertext data segment based on the first encryption parameter set, to obtain the first plaintext data segment; and removing the first encryption parameter set from the first plaintext data flow, to obtain the first plaintext data flow.

In a possible implementation method, the processing unit 1820 is configured to perform forward error correction decoding or performing descrambling and forward error correction decoding on the first ciphertext data flow, to obtain a second ciphertext data flow; and decrypting the third ciphertext data segment of the second ciphertext data flow based on the first encryption parameter set, to obtain the first plaintext data segment.

In a possible implementation method, the processing unit 1820 is configured to convert N first ciphertext data flows into at least one serial ciphertext data flow based on a specified proportion; performing forward error correction decoding or performing descrambling and forward error correction decoding on the at least one serial ciphertext data flow, to obtain at least one decoded serial ciphertext data flow; converting the at least one decoded serial ciphertext data flow into N third ciphertext data flows; and separately decrypting the third ciphertext data segment of the N third ciphertext data flows based on the first encryption parameter set, to obtain N first plaintext data segments.

In a possible implementation method, one first AM and one encryption parameter set are included between every two ciphertext data segments, and one first AM and one ciphertext data segment are included between every two encryption parameter sets; or one encryption parameter set between every two first AMs is divided into at least two encryption parameter subsets, and some or all encryption subsets in the at least two encryption parameter subsets are discontinuous.

In a possible implementation method, the processing unit 1820 is configured to remove the first encryption parameter set and padding information from the first plaintext data flow, to obtain the first plaintext data flow.

In a possible implementation method, the padding information is padding information encrypted by using the first encryption parameter set.

In a possible implementation method, a quantity of bits of padding information between two adjacent first AMs is determined based on a quantity of bits spaced between the two adjacent first AMs and a quantity of bits in the encryption parameter set between the two adjacent first AMs.

In a possible implementation method, $(Y+a+P) \mod Q=0$, where Y is the quantity of bits spaced between the two adjacent first AMs, a is the quantity of bits in the encryption parameter set between the two adjacent first AMs, P is the quantity of bits of the padding information between the two adjacent first AMs, Q is a quantity of bits included in one forward error correction codeword, and mod is a modulo operation.

In a possible implementation method, P is a minimum value that meets the formula.

Optionally, the communication apparatus 1800 may further include a storage unit. The storage unit is configured to store data and/or instructions (which may also be referred to as code or a program). The foregoing units may interact with or be coupled to the storage unit, to implement a corresponding method or function.

It should be understood that division into units in the apparatus is merely logical function division. During an actual implementation, all or some of the units may be integrated into one physical entity or may be physically separated. In addition, all units in the apparatus may be implemented in a form of software invoking by a processing element; may also be implemented in the form of hardware; and alternatively, some units may be implemented in a form of invoking by software through a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing method, for example, one or more application-specific integrated circuits (ASIC), one or more microprocessors (DSP), or one or more field programmable gate arrays (FPGA), or a combination of at least two of these integrated circuit forms. For another example, when the units in the apparatus may be implemented in a form of scheduling a program by the processing element, the processing element may be a general-purpose processor, for example, a central processing unit (CPU) or another processor that can invoke the program. For still another example, the units may be integrated and implemented in a form of a system-on-a-chip (SOC).

The transceiver unit 1810 may be an interface circuit of the apparatus, and is configured to receive a signal from another apparatus or send a signal to another apparatus. For example, when the apparatus is implemented in a manner of a chip, the transceiver unit 1810 is an interface circuit configured by the chip to receive a signal from another chip or apparatus, and/or send a signal to another chip or apparatus.

Figure 19:
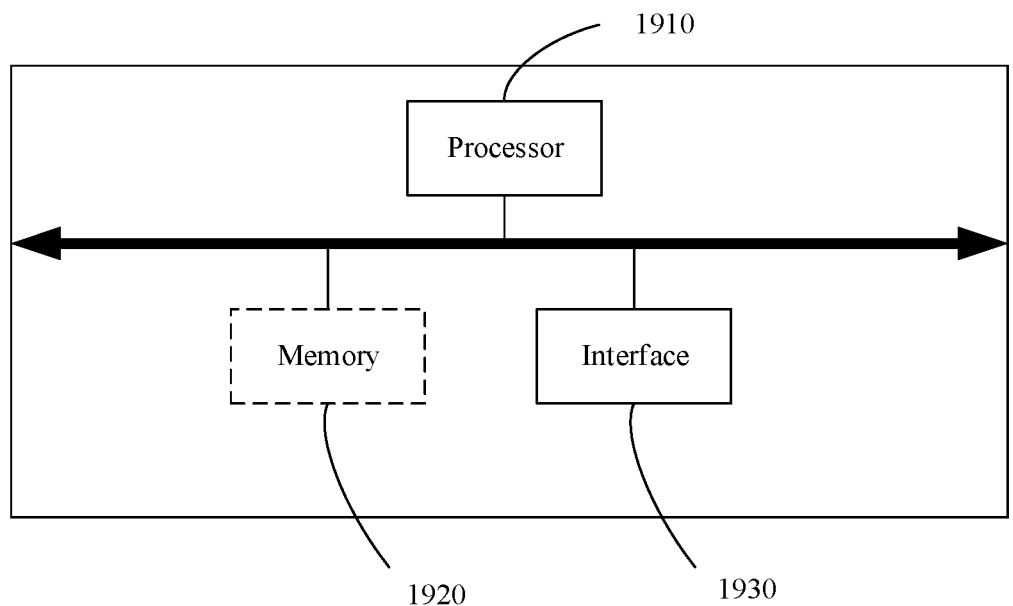
FIG. 19 is a schematic diagram of a communication apparatus according to an embodiment of this application.

FIG. 19 is a schematic diagram of a communication apparatus according to an embodiment of this application. The communication apparatus is configured to implement operations in the communication apparatus (for example, a communication apparatus in an optical module or a communication apparatus in a network device) in the foregoing embodiment. As shown in FIG. 19, the communication apparatus includes: a processor 1910 and an interface 1930. Optionally, the communication apparatus further includes a memory 1920. The interface 1930 is configured to implement communication with another device.

The method performed by the communication apparatus in the foregoing embodiment may be implemented by invoking a program stored in the memory (which may be the memory 1920 in the communication apparatus, or may be an external memory) by the processor 1910. In other words, the communication apparatus may include the processor 1910. The processor 1910 invokes the program in the memory, to perform the method performed by the communication apparatus in the foregoing method embodiment. The processor herein may be an integrated circuit having a signal processing capability, for example, a CPU. The communication apparatus may be implemented by one or more integrated circuits configured to implement the foregoing method. For example, one or more ASICs, one or more microprocessor DSPs, one or more FPGAs, or a combination of at least two of these integrated circuit forms. Alternatively, the foregoing implementations may be combined.

Specifically, a function/implementation process of the transceiver unit 1810 and the processing unit 1820 in FIG. 18 may be implemented by the processor 1910 in the communication apparatus 1900 shown in FIG. 19 by invoking the computer-executable instructions stored in the memory 1920. Alternatively, a function/implementation process of the processing unit 1820 in FIG. 18 may be implemented by the processor 1910 in the communication apparatus 1900 shown in FIG. 19 by invoking the computer-executable instructions stored in the memory 1920. A function/implementation process of the transceiver unit 1810 in FIG. 18 may be implemented through an interface 1930 in the communication apparatus 1900 shown in FIG. 19.

It should be understood that sequence numbers of the foregoing processes do not necessarily indicate execution sequences in various embodiments of this application. The execution sequences of the processes should be determined according to functions and internal logic of the processes, and should not be construed as any limitation on the implementation processes of embodiments of the present disclosure.

This application further provides a computer-readable medium. The computer-readable medium stores a computer program. When the computer program is executed by a computer, a function of any one of the foregoing method embodiments is implemented.

This application further provides a computer program product. When the computer program product is executed by the computer, a function of any one of the foregoing method embodiments is implemented.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The various illustrative logical units and circuits described in embodiments of this application may implement or operate the described functions through a general purpose processor, a digital signal processor, an application-specific integrated circuit (ASIC), a field programmable gate array (FPGA) or other programmable logic devices, discrete gate or transistor logic, discrete hardware components, or a design of any combination thereof. The general purpose processor may be a microprocessor. Optionally, the general purpose processor may also be any conventional processor, controller, microcontroller, or state machine. A processor may also be achieved through the combination of computing devices, such as combination of a digital signal processor and a microprocessor, multiple microprocessors, one or more microprocessors and one digital signal processor, or any other similar configurations.

The steps of the method or algorithm described in embodiments of this application may be directly embedded in hardware, in a software unit executed by a processor, or in a combination thereof. The software unit may be stored in a random access memory (RAM), a flash memory, a read-only memory (ROM), an EPROM memory, an EEPROM memory, a register, a hard disk, a removable disk, a CD-ROM, or any other form of storage medium in the art. For example, storage media may be connected to a processor so that the processor may read information from the storage media and may store the information in the storage media. Optionally, the storage medium may further be integrated into the processor. The processor and the storage medium may be disposed in an ASIC.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

In one or more examples of designs, the functions described in this application may be implemented in hardware, software, firmware, or a combination thereof. If solutions in the present disclosure are implemented by software, these functions may be stored in a computer-readable medium or are transmitted to the computer-readable medium in a form of one or more instructions or code. The computer-readable medium is either a computer storage medium or a communication medium that enables a computer program to move from one place to another. The storage medium may be an available medium that may be accessed by any general or special computer. For example, such a computer-readable medium may include, but is not limited to, a RAM, a ROM, an EEPROM, a CD-ROM or other optical disc storage, magnetic disk storage or magnetic storages, or any other medium that can be used to carry or store program code in the form of instructions or data structures and in other forms that can be accessed by a general-purpose or special-purpose computer or a general-purpose or special-purpose processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk and disc include a compact disc, a laser disc, an optical disc, a digital versatile disc (DVD), a floppy disk, and a blu-ray disc, where the disk usually reproduces data magnetically, while the disc usually reproduces data optically through lasers. The foregoing combination may also be included in the computer-readable medium.

A person of skill in the art should be aware that in one or more of the foregoing examples, the functions described in this application may be implemented by using hardware, software, firmware, or any combination thereof. When solutions in the present disclosure is implemented by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification or improvement made based on the technical solutions of this application shall fall within the protection scope of this application. The foregoing description in the specification of this application may enable any technology in the art to utilize or implement content of this application, and any modification based on the disclosed content shall be considered obvious in the art. The basic principles described in this application may be applied to other variations without departing from the essence and scope of the solutions of this application. Therefore, the content disclosed in this application is not limited to the described embodiments and designs, but may further be extended to a maximum scope that is consistent with principles of this application and new features disclosed in this application.

Although this application is described with reference to specific features and all embodiments thereof, it is clear that various modifications and combinations may be made to them without departing from the scope of this application. Correspondingly, the specification and the accompanying drawings are merely example descriptions of this application defined in the appended claims, and are considered as any of or all modifications, variations, combinations or equivalents that cover the scope of this application. It is clear that a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A data transmission method, comprising:
    generating N ciphertext data flows, wherein a first ciphertext data flow is one of the N ciphertext data flows, the first ciphertext data flow comprises at least two first alignment markers (AMs), at least two encryption parameter sets, and at least two ciphertext data segments, one ciphertext data segment and one encryption parameter set are comprised between every two first AMs, the at least two first AMs are used for data alignment of the N ciphertext data flows, and N is a positive integer; and
    sending the N ciphertext data flows;
    wherein the generating the N ciphertext data flows comprises:
    obtaining N plaintext data flows, wherein a first plaintext data flow is one of the N plaintext data flows, the first plaintext data flow comprises at least two second AMs and at least two plaintext data segments, the at least two second AMs are used for data alignment of the N plaintext data flows, one plaintext data segment is comprised between every two second AMs, and one second AM is comprised between every two plaintext data segments; and
    generating the first ciphertext data flow based on the first plaintext data flow and the at least two encryption parameter sets.

2. The method according to claim 1, wherein the encryption parameter set comprises one or more of the following:
    an encryption type, wherein the encryption type identifies whether encryption is performed;
    a key identification, wherein the key identification indicates an encryption key used by a first ciphertext data segment; or an initialization vector identification, wherein the initialization vector identification indicates an initialization vector used by a second ciphertext data segment.

3. The method according to claim 2, wherein two first AMs adjacent to the second ciphertext data segment and two first AMs adjacent to the initialization vector identification are respectively the same.

4. The method according to claim 2, wherein the encryption parameter set further comprises an integrity check value, and the integrity check value is used to perform integrity check on a ciphertext data segment between the two first AMs before the integrity check value.

5. The method according to claim 1, wherein a first plaintext data segment is one of the at least two plaintext data segments, and a third ciphertext data segment is a ciphertext data segment obtained by encrypting the first plaintext data segment by using a first encryption parameter set in the at least two encryption parameter sets; and
the generating of the first ciphertext data flow based on the first plaintext data flow and the at least two encryption parameter sets comprises:
encrypting the first plaintext data segment based on the first encryption parameter set, to obtain the third ciphertext data segment; and
inserting the first encryption parameter set into the first plaintext data flow, to obtain the first ciphertext data flow.

6. The method according to claim 5, wherein the inserting of the first encryption parameter set into the first plaintext data flow to obtain the first ciphertext data flow comprises:
inserting the first encryption parameter set into the first plaintext data flow, to obtain a second ciphertext data flow; and
performing forward error correction encoding or performing scrambling and forward error correction encoding on the second ciphertext data flow, to obtain the first ciphertext data flow.

7. The method according to claim 5, wherein the inserting of the first encryption parameter set into the first plaintext data flow to obtain the first ciphertext data flow comprises:
separately inserting the first encryption parameter set into N first plaintext data flows, to obtain N third ciphertext data flows;
converting the N third ciphertext data flows into at least one serial ciphertext data flow based on a specified proportion;
performing forward error correction encoding or performing scrambling and forward error correction encoding on the at least one serial ciphertext data flow, to obtain at least one encoded serial ciphertext data flow; and
converting the at least one encoded serial ciphertext data flow into N first ciphertext data flows.

8. The method according to claim 1, wherein the obtaining of the N plaintext data flows comprises:
receiving M physical lane signals, wherein M is a positive integer; and
converting the M physical lane signals into the N plaintext data flows based on a specified proportion.

9. The method according to claim 1, wherein
one first AM and one encryption parameter set are comprised between every two ciphertext data segments, and one first AM and one ciphertext data segment are comprised between every two encryption parameter sets; or
one encryption parameter set between every two first AMs is divided into at least two encryption parameter subsets, and some or all encryption subsets in the at least two encryption parameter subsets are discontinuous.

10. The method according to claim 5, wherein
the inserting of the first encryption parameter set into the first plaintext data flow to obtain the first ciphertext data flow comprises:
inserting the first encryption parameter set and padding information into the first plaintext data flow, to obtain the first ciphertext data flow.

11. The method according to claim 10, wherein the padding information is padding information encrypted by using the first encryption parameter set.

12. The method according to claim 10, further comprising:
determining a quantity of bits of padding information between two adjacent first AMs based on a quantity of bits spaced between the two adjacent first AMs and a quantity of bits in the encryption parameter set between the two adjacent first AMs.

13. The method according to claim 12, wherein $(Y+a+P) \bmod Q=0$, wherein

Y is the quantity of bits spaced between the two adjacent first AMs, a is the quantity bits in the encryption parameter set between the two adjacent first AMs, P is the quantity of bits of the padding information between the two adjacent first AMs, Q is a quantity of bits comprised in one forward error correction codeword, and mod is a modulo operation.

14. A data transmission apparatus, comprising:
one or more processors; and
a computer-readable memory storing a program to be executed by the one or more processors, the program including instructions that, when executed by the one or more processors, cause the apparatus to:
generate N ciphertext data flows, wherein a first ciphertext data flow is one of the N ciphertext data flows, the first ciphertext data flow comprises at least two first alignment markers (AMs), at least two encryption parameter sets, and at least two ciphertext data segments, one ciphertext data segment and one encryption parameter set are comprised between every two first AMs, the at least two first AMs are used for data alignment of the N ciphertext data flows, and N is a positive integer; and
send the N ciphertext data flows;
wherein the generating the N ciphertext data flows comprises:
obtaining N plaintext data flows, wherein a first plaintext data flow is one of the N plaintext data flows, the first plaintext data flow comprises at least two second AMs and at least two plaintext data segments, the at least two second AMs are used for data alignment of the N plaintext data flows, one plaintext data segment is comprised between every two second AMs, and one second AM is comprised between every two plaintext data segments; and
generating the first ciphertext data flow based on the first plaintext data flow and the at least two encryption parameter sets.

15. The apparatus according to claim 14, wherein the encryption parameter set comprises one or more of the following:
an encryption type, wherein the encryption type identifies whether encryption is performed;
a key identification, wherein the key identification indicates an encryption key used by a first ciphertext data segment; or an initialization vector identification, wherein the initialization vector identification indicates an initialization vector used by a second ciphertext data segment.

16. The apparatus according to claim 15, wherein two first AMs adjacent to the second ciphertext data segment and two first AMs adjacent to the initialization vector identification are respectively the same.

17. The apparatus according to claim 15, wherein the encryption parameter set further comprises an integrity check value, and the integrity check value is used to perform integrity check on a ciphertext data segment between the two first AMs before the integrity check value.

18. The apparatus according to claim 14, wherein a first plaintext data segment is one of the at least two plaintext data segments, and a third ciphertext data segment is a ciphertext data segment obtained by encrypting the first plaintext data segment by using a first encryption parameter set in the at least two encryption parameter sets; and the generating of the first ciphertext data flow based on the first plaintext data flow and the at least two encryption parameter sets comprises:
encrypting the first plaintext data segment based on the first encryption parameter set, to obtain the third ciphertext data segment; and
inserting the first encryption parameter set into the first plaintext data flow, to obtain the first ciphertext data flow.

19. The apparatus according to claim 18, wherein the inserting of the first encryption parameter set into the first plaintext data flow to obtain the first ciphertext data flow comprises:
inserting the first encryption parameter set into the first plaintext data flow, to obtain a second ciphertext data flow; and
performing forward error correction encoding or performing scrambling and forward error correction encoding on the second ciphertext data flow, to obtain the first ciphertext data flow.

20. The apparatus according to claim 18, wherein the inserting of the first encryption parameter set into the first plaintext data flow to obtain the first ciphertext data flow comprises:
separately inserting the first encryption parameter set into N first plaintext data flows, to obtain N third ciphertext data flows;
converting the N third ciphertext data flows into at least one serial ciphertext data flow based on a specified proportion;
performing forward error correction encoding or performing scrambling and forward error correction encoding on the at least one serial ciphertext data flow, to obtain at least one encoded serial ciphertext data flow; and
converting the at least one encoded serial ciphertext data flow into N first ciphertext data flows.

* * * * *